United States Patent
Swars

(10) Patent No.: US 6,589,910 B1
(45) Date of Patent: Jul. 8, 2003

(54) CATALYTIC CONVERTER SUBSTRATE

(76) Inventor: Helmut Swars, Riedweg 11, 51429 Bergisch Gladbach (DE)

( * ) Notice: Subject to any disclaimer, the term of this patent is extended or adjusted under 35 U.S.C. 154(b) by 0 days.

(21) Appl. No.: 09/571,726

(22) Filed: May 15, 2000

(65) Prior Publication Data (65)

(30) Foreign Application Priority Data

May 14, 1999 (DE) .......................................... 199 22 355

(51) Int. Cl.⁷ .............................................. C01B 31/30
(52) U.S. Cl. ...................................................... 502/439
(58) Field of Search ........................... 502/439, 527.18, 502/527.14, 527.19

(56) References Cited

U.S. PATENT DOCUMENTS

| | | |
|---|---|---|
| 4,098,722 A | 7/1978 | Cairns et al. |
| 5,177,960 A | 1/1993 | Hitachi et al. |
| 5,460,790 A | 10/1995 | Shustorovich et al. |
| 5,518,697 A * | 5/1996 | Dalla Betta et al. ........ 422/173 |
| 5,643,484 A | 7/1997 | Swars et al. |
| 5,667,875 A | 9/1997 | Usui |

FOREIGN PATENT DOCUMENTS

| | | |
|---|---|---|
| DE | 89 09 128 | 1/1991 |
| DE | 195 30 850 | 2/1997 |
| DE | 297 23 721 | 3/1999 |
| DE | 198 30 342 | 11/1999 |
| EP | 0 870 909 | 10/1998 |
| EP | 0 887 521 | 12/1998 |

OTHER PUBLICATIONS

Patent Abstracts of Japan, Publication No. 08029088, Publication Date Feb. 2, 1996.
Patent Abstracts of Japan, Publication No. 10309475, Publication Date Nov. 24, 1998.
Patent Abstracts of Japan, Publication No. 09103686, Publication Date Apr. 22, 1997.

* cited by examiner

Primary Examiner—Stanley S. Silverman
Assistant Examiner—Edward M. Johnson
(74) Attorney, Agent, or Firm—Browdy and Neimark, P.L.L.C.

(57) ABSTRACT

A catalytic converter substrate is provided with a large number of continuous flow paths for a fluid medium and with carrier elements for a catalyst material extending in the longitudinal direction of the flow paths. In order to create a substrate that leads to a catalytic converter with low pressure losses and low inertia with increased efficiency, carrier elements are provided that display edges around which flow is possible in the longitudinal direction of the flow paths. The carrier elements are designed in the form of wires 45, which are located in the middle of flow ducts 41, where the flow ducts are formed by an arrangement of foil layers 40. Stiffening wires 42, extending perpendicular to the foil layers, are provided for stabilisation of the substrate.

27 Claims, 14 Drawing Sheets

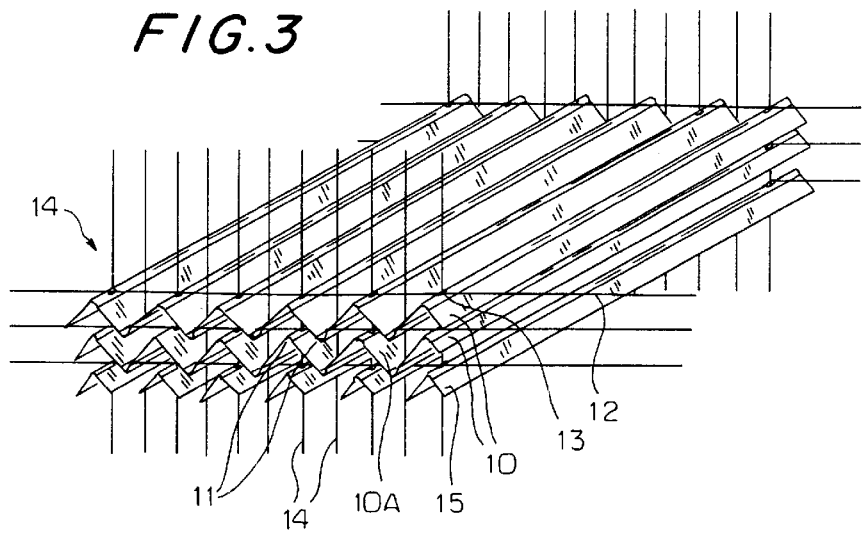
FIG.3
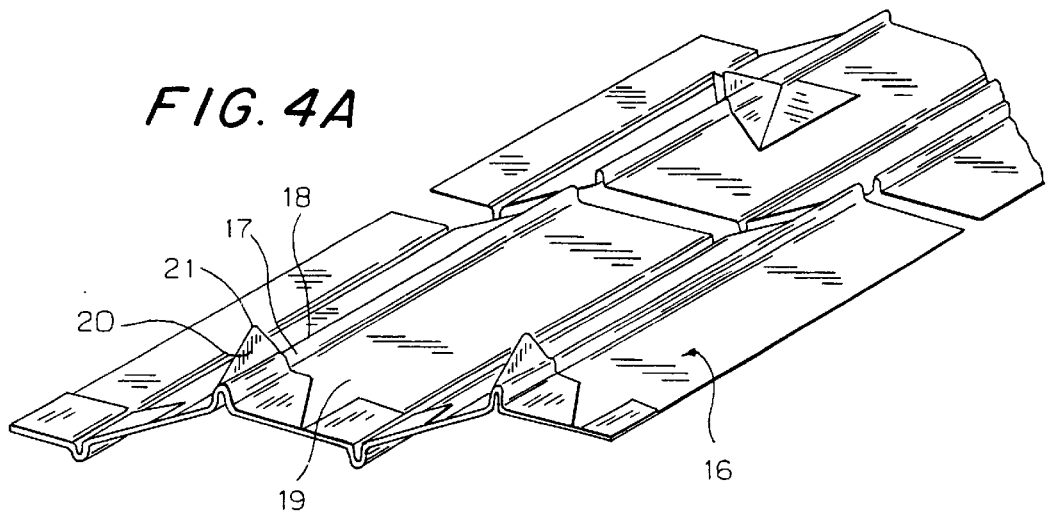
FIG.4A
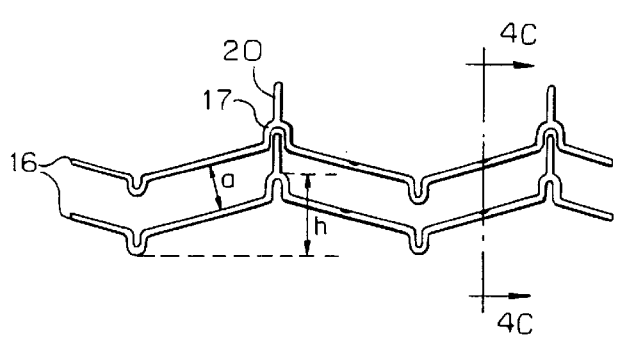
FIG.4B
FIG.4C

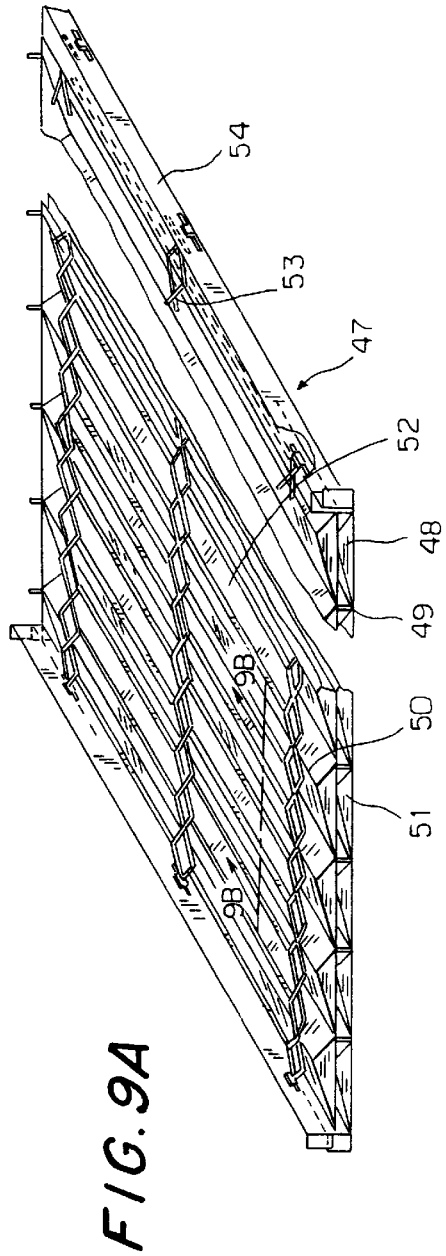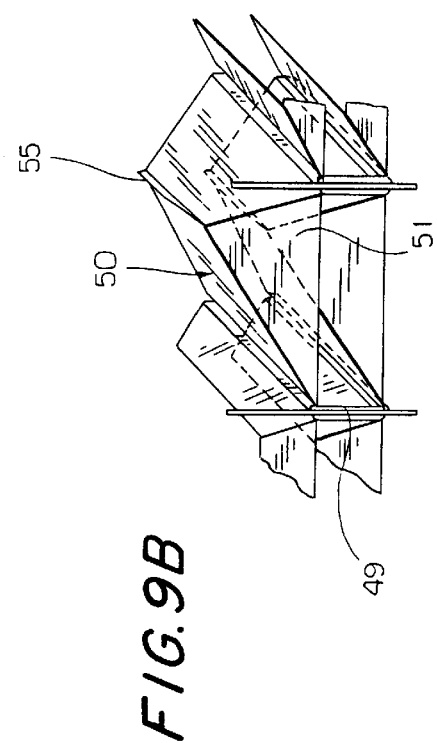
FIG. 9A
FIG. 9B

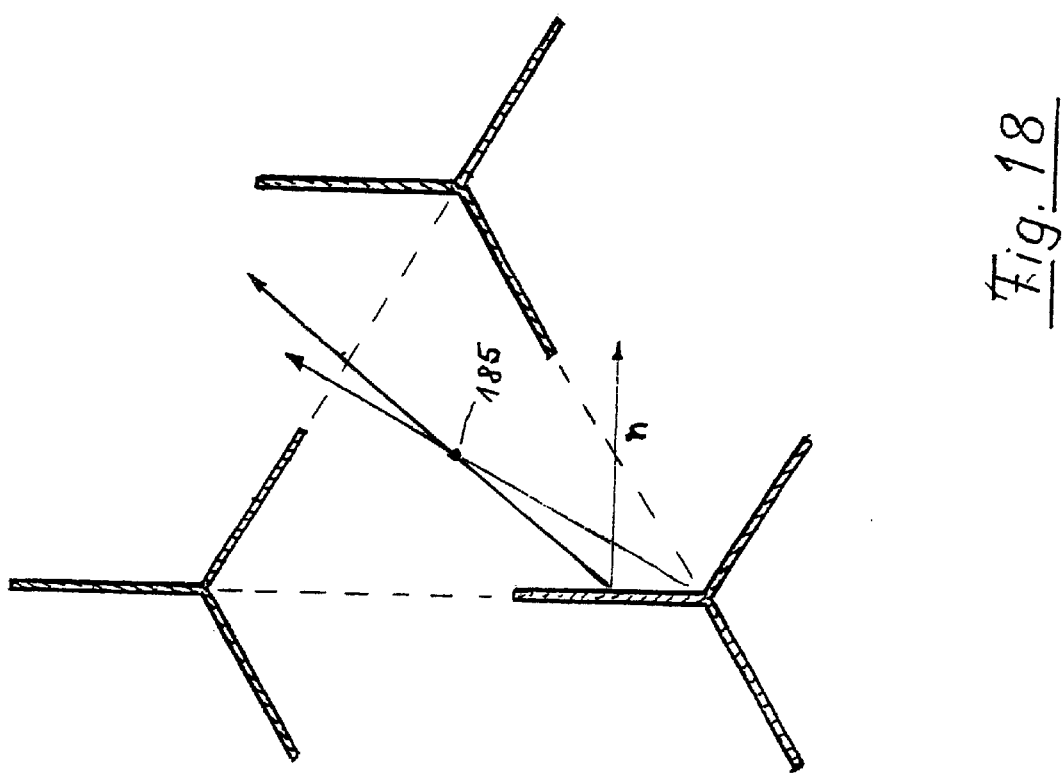
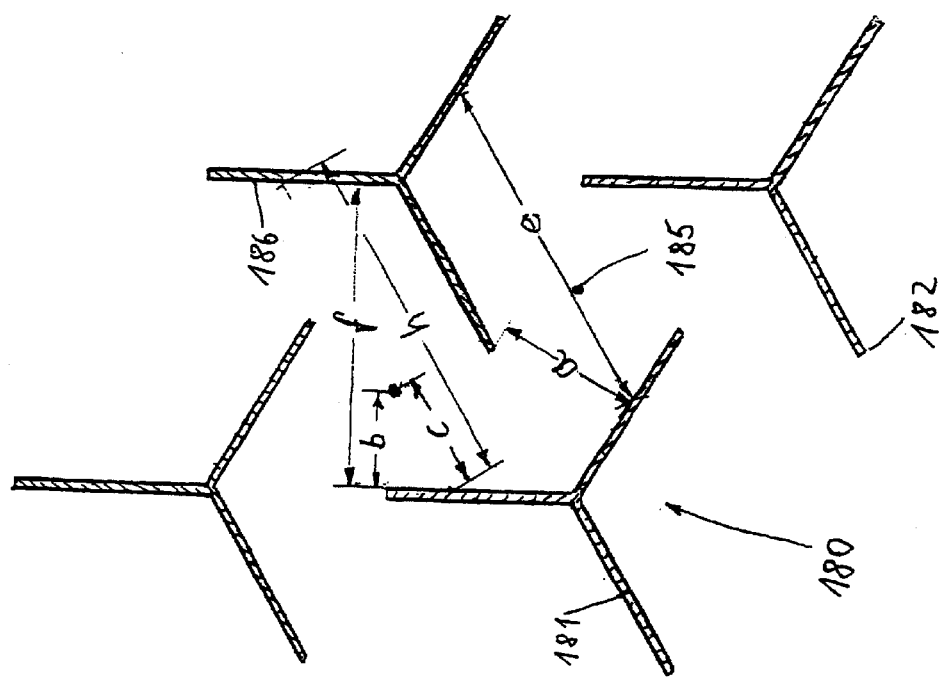
Fig. 18

CATALYTIC CONVERTER SUBSTRATE

FIELD OF THE INVENTION

The invention relates to a catalytic converter substrate with a large number of continuous flow paths for a fluid medium and with carrier elements for a catalyst material extending in the longitudinal direction of the flow paths.

BACKGROUND OF THE INVENTION

A substrate of this type is known from EP 0 430 945 B1, which is constructed of at least partially structured foils, where the sequence of the smooth and corrugated foils positioned against each other in the honeycomb forms ducts that are permeable to a fluid and separated from each other. The foil stacks are wrapped around each other in order to simplify manufacture of the honeycomb.

Catalytic converter substrates of this kind are capable of improvement in relation to various aspects.

Due to the very small flow ducts with sinusoidal cross-section, areas occur in the gussets or narrow areas of the ducts which have difficulty in coming into contact with the fluid medium in the central, hydraulically effective flow cross-sections, as thicker flow boundary layers develop, or dead spaces containing inert, i.e. already reacted, medium that is not transported away, or only after a delay, occur here as a result of the viscous adhesion of the fluid medium to the partial surfaces of the duct circumference. The catalytic efficiency of the partial surfaces covered in this way is low and the overall efficiency of the precious-metal coatings used in the catalytic converter thus capable of improvement. The result of this is that the minimum volume of the catalytic converter, and thus also its weight, are subject to a lower limit. Therefore, the medium or gas, reacted as effectively as possible directly on the coating, without inhibition of reaction and mass transfer, should be transported away as quickly and uniformly as possible with the through-flow, rather than occupying and reducing the efficiency of a major proportion of the coating surface in the form of thicker, inert, exceedingly slow-flowing and occasionally stagnating medium layer.

Moreover, the ready-for-use catalytic converter, and thus also the substrate, must meet the requirement that the pressure loss when the fluid medium flows through the substrate be as low and uniform as possible. Moreover, while offering high efficiency, the overall weight of the catalytic converter should be as low as possible, particularly giving consideration to the additionally applied, porous, catalytically effective coating, so that the inertia of the catalytic converter during the warm-up phase up to reaching operating temperature remains low, as is desirable in the automotive sector, for example. Consequently, there are limits to the increase in catalyst activity that can be achieved by constantly reducing the diameter of the flow ducts and increasing the total internal surface area.

Consequently, the generally harmful proportion of the volume where the substrate has only a supporting and separating function, comprising unused structural walls, coating material and inert, static medium volumes, which can account for up to half the cross-section and more than half the volume, is thus to be minimised.

Furthermore, high demands are to be placed on catalytic converters, particularly also in the automotive sector, in relation to temperature uniformity in the structure, as catalytic converters are exposed to severe temperature fluctuations, particularly during the warm-up and cool-down phases, this resulting in prolonged inhibition of the chemical reaction during cold-start, re-start, part-load and cold-weather operation, especially in the peripheral area of the substrate.

Furthermore, the catalytic converter substrate should be designed in such a way as to achieve the most homogeneous possible pressure and velocity distribution of the fluid medium over the substrate cross-section, thus making the effective flow retention time more uniform and, consequently, longer.

SUMMARY OF THE INVENTION

The object of the invention is therefore to create a catalytic converter substrate which is optimised in relation to the above-mentioned problems and, in particular, leads to a catalytic converter with reduced precious-metal and material input in a reduced or optimised overall volume, while maintaining or improving efficiency.

According to the invention, this object is solved in that carrier elements are provided that display edges around which flow is possible in the longitudinal direction of the flow paths and to which, therefore, only minimal boundary layers can adhere. It was found that the edges introduced according to the invention, which are flowed around by the laminar flow of the fluid medium without significantly increasing any pressure loss and with which, owing to their extending in the longitudinal direction of the flow paths, there is comparatively intensive contact and, on average, a long contact time with a given volume increment of the fluid medium, lead to a significant improvement in catalytic converter efficiency. The edges around which flow is possible project into the flowing medium, increasing the turbulence therein and generally increasing the specific conversion capacity of the coating carrier surface substantially compared to the plane areas of the side walls of narrow, non-round flow ducts, thus constituting catalytically particularly effective areas. In this context, the edges can be either angular or rounded, e.g. in the form of wires or small tubes with a circular cross-section.

Hereafter, the term "carrier elements" is always intended to mean those with edges around which flow is possible, including those permitting full circumferential flow, unless expressly stated otherwise.

The edges around which flow is possible preferably lie parallel or at an acute angle to the longitudinal direction of the catalytic converter substrate.

In this context, the total length of the edges around which flow is possible in relation to the total internal surface of the substrate and/or their arrangement and frequency distribution over the cross-section and the volume of the substrate is designed such that the catalytic activity assignable to the carrier elements according to the invention is significant in relation to the overall efficiency of the catalytic converter, e.g. amounts to more than 10% of the total efficiency. In particular, the catalytic efficiency assigned to the carrier elements can be greater than that of the surface and volume areas not provided with the carrier elements according to the invention. In this context, a carrier element is assigned a cross-sectional area of the substrate in which contact or material conversion of the fluid medium takes place on the edge of the carrier element.

The ratio of the length of the edges around which flow is possible to the substrate volume through which flow is possible, which can be calculated as the total of the hydraulic cross-sections divided by the substrate length, can be 1 cm per 5 to 0.8 cm$^3$ or less, averaged over the entire substrate volume, this being equivalent to a continuous edge around which flow is possible in a duct with a hydraulic radius of approx. 15 or 5 mm. In this context, the hydraulic cross-section is in each case defined by an inscribed circle touching the duct walls and, in the case of a contiguous gas plenum, by the radius of adjacent circles. In the case of multi-rib webs, a corresponding multiple of the web length must be taken, while at least twice the length must be used for round wires or profiles, as flow from opposite sides is possible here.

The total length of the edges around which flow is possible along a flow path can be a multiple of the distance between adjacent edges. This particularly applies to the continuous length of a single edge around which flow is possible, where the carrier elements or edges can also be axially interrupted or several carrier elements with edges around which flow is possible can be arranged one behind the other a distance apart in the longitudinal direction of a flow path. If the edges around which flow is possible are of arched or helical design, for example, or arranged on twisted or bent profiles like separate carrier elements, e.g. in the form of wires or webs, the actual edge length must be taken into consideration, which can greatly exceed the length of the substrate. In this context, the twisted components can display several laterally projecting, likewise twisted ribs or be designed as spiral springs. The twisted or helical edges preferably run at an acute angle to the longitudinal direction of flow. Areas of the edges of the twisted components can also be locally supported on or against other components or the walls of the flow ducts.

The total length of the edges around which flow is possible of the carrier element or elements along a flow path can be 25%, preferably 50% or more, of the length of the substrate. Particularly preferably, the edges extend over virtually the entire length of the substrate. In the case of edges on twisted or bent components, the total edge length can also greatly exceed the length of the substrate.

The carrier elements can also be designed as webs extending in the direction of flow, being formed by foil folds in foil sections. The foil folds can be of single-wall design in the form of notched tabs and/or double-wall design in the form of fold webs, the latter case resulting in more stable foil sections with twice or several times the foil thickness. The folds or notched tabs can be provided on both sides of the foil sections, e.g. also in alternating fashion on both sides. The webs can be provided on foil sections additionally inserted into the substrate, and the notched tabs or foil folds can also be provided on foil sections from which the three-dimensional structural system of the substrate is constructed.

If the carrier elements provided with edges around which flow is possible are designed as web-like foil folds, the width of the webs, e.g. measures at their base or as the distance between the turning points in the case of curved web flanks, is preferably small compared to the web height and/or the distance between adjacent webs, e.g. less than a ratio of 1:2, preferably less than 1:5. In this context, the fold legs of the webs preferably contact each other or are only a small distance apart, e.g. due to the manufacturing process.

The webs are advantageously of flat design and, for example, produced by acute-angled foil folds, so that their width is just a few times the foil thickness. The angle enclosed by the peripheries of the webs can be less than 45°, preferably less than 30°, up to advantageously virtually 0°. If the webs are designed as foil folds, the distance between flanks of the webs is preferably to be selected to be so small that coating material with the usual viscosity and particle size for the given application does not penetrate between the web flanks, or only to a slight extent. Areas with poor medium exchange and catalytically ineffective material accumulations are avoided or reduced in this way. Foil sections laterally adjacent to the webs are advantageously angled relative to the webs at an obtuse angle, preferably by approx. 100° to 150°, particularly approx. 120°. The flat design of the webs means that the free flow cross-section of the substrate is virtually not reduced by the face ends of the webs, e.g. by 10% or less, for which purpose the webs can be designed as foil folds with open face ends allowing the medium to flow through or laterally behind them, so that only slight flow resistance occurs for the medium flowing on one side of the web or a foil layer.

The carrier elements preferably permit flow around their entire circumference, at least in some areas, particularly advantageously over virtually the entire length of the substrate, and are, for example, designed in the form of free-standing webs, wires, tube sections or partial tube circumferences, or as partial areas of expanded-metal layers.

The height or width of the webs with edges around which flow is possible, or the diameter of the carrier elements, is preferably small compared to the distance of the edges and surfaces around which flow is possible from each other and/or from the side wall of a flow duct. For example, the ratio can be less than 1/2, preferably less than 1/10 to 1/25 or less.

The carrier elements can be designed as tube sections with a circular or rectangular cross-section, or as webs of any shape, particularly with an angular, e.g. rectangular, square, triangular or obtuse-angled cross-section, or with an arched or corrugated cross-section, as solid or hollow profiles in each case. The carrier elements can have the contour of partial tube circumferences of different geometries, or also display additional lateral ribs and, for example, have a star-shaped cross-section with 3 to 5 or more ribs. Web-like carrier elements can be located on other, e.g. conventional, carrier elements, such as foils, and project from these on one side or towards several sides, particularly towards opposite sides, where webs of adjacent components can intermesh in fan-like or comb-like fashion.

Advantageously, carrier elements with outside surfaces curved in helical or scoop-like fashion, e.g. in the form of twisted webs, are provided, which cause the passing medium to rotate, preferably only weakly, transverse to the direction of flow. The curved surfaces are preferably oriented in such a way that the medium flows around them at an acute angle and they swirl the medium.

The direction of twisting of the deflecting surfaces of adjacent elements relative to each other is preferably selected in such a way that the rotary motion of adjacent deflected medium flow filaments has the effect of improving mixing and generating more turbulence at the edges. The direction of twisting of adjacent deflecting surfaces can, in particular, be mutually opposite, this being advantageous compared to an arrangement with matching direction of twisting, where less friction results on the shearing areas of the flow filaments.

The carrier elements can be arranged in a variety of ways, combinations of carrier elements of different designs particularly being possible in various ways, e.g. in the form of expanded-metal layers or profiled webs combined with wires and/or combinations of webs with different profiles. The carrier elements are preferably arranged parallel to each other in each case, although they can also enclose an angle relative to each other. The edges around which flow is possible can each also be partially or completely surrounded by concave surfaces, such as circular duct walls, which can be formed by carrier elements with or without edges around which flow is possible. As a result, the surface area can be optimised relative to the degree of turbulence of the flow, particularly given the necessary stability of the substrate.

The carrier elements can be distributed uniformly over the cross-section of the substrate, preferably on a square or hexagonal grid, or they can also be distributed irregularly or randomly. In this context, web-like carrier elements, which can have star or channel-shaped profiles, are advantageously arranged in a manner that would correspond to a section of a substrate with a given arrangement of flow ducts, particularly the densest possible packing of circular or square tubes, where the position of the carrier elements can, in particular, correspond to the abutting lines of adjacent ducts or the wall areas of the flow ducts located centrally between abutting lines. In this context, the orientation and number of webs on the carrier elements can correspond to that of the adjacent wall areas of the corresponding duct structure, or deviate from this, e.g. be rotated relative to this. For instance, three-pointed profile webs can be provided in the densest possible hexagonal arrangement, the ribs of which each enclose an angle of 120°, where the ribs of adjacent profile webs are arranged in the gaps of each other. Stacked rows of channel-shaped webs can also be provided, where the open sides of the channels are oriented in opposite directions on adjacent stacks. Other carrier elements with edges around which flow is possible, e.g. wires, can be arranged in gaps between the profile webs. This applies in each case to arrangements of carrier elements both in flow ducts and in open substrates with a medium plenum.

The carrier elements preferably extend parallel to the longitudinal direction of the substrate, although they can also run at an angle to this direction, particularly an acute angle, in some sections or over their entire length.

According to a preferred configuration, the carrier elements are arranged in flow ducts which limit media exchange transverse to the flow paths, where the edges around which flow is possible project into the flow ducts. In this context, a degree of media exchange transverse to the flow paths can be possible through feed-through openings made in the flow duct walls. The carrier elements can be arranged approximately in the centre of the flow ducts and connected to each other to form two-dimensional layers, e.g. in the form of wire meshes or expanded-metal layers.

The carrier elements having display edges can be arranged at least partially or completely in the flow ducts of the fluid medium which hinder a fluid exchange at most or completely in a dierection transverse to the longitudinal direction of the carrier body or converter substrate.

According to another advantageous configuration, several carrier elements, spaced laterally apart from each other, are arranged in a flow duct, preferably being equally spaced from each other and from the duct wall, where the distance between the carrier elements can roughly correspond to the distance of the carrier elements from the duct wall.

Furthermore, advantageously the display edges or elements permitting a flow fully circumferentially are arranged in a section of the carrier body (i.e converter substrate) which is designed to let pass a fluid medium, preferably with substantially no additional fluid pressure loss, in one space direction, preferably in two space directions generating a two-dimensional area. The extension of the area permitting a fluid medium to pass transverse to the longitudinal direction of the carrier body preferably in one or in both space directions is a multiple of the foil layer distance or the distance of the display edges or of the profiles permitting a full circumferential flow of the medium, for instance the two-fold or 3- to 5-fold of the distance, respectively, or even larger, for instance up to the half of the total carrier-body width in this direction. Preferably, substantially no cross-section lowering of the ducts or flow paths hindering a fluid exchange is given over this distance in the transverse direction of the carrier body, i.e. no cross section lowering of the flow path being more than 25% or 50% of the foil layer distance or the distance of the display edges or profiles permitting full circumferential flow.

The flow ducts provided with the carrier elements according to the invention can have an—approximately—isogonal cross-section with, for example, a circular, triangular, square, hexagonal or sinusoidal shape, which encloses an incircle, where the carrier elements can be arranged in bundles of two, three, four or more profiles with identical or different cross-sections. As a result, even relatively large or geometrically unfavourable duct cross-sections can be used, as the carrier elements according to the invention permit the flexible setting of favourable diffusion conditions. In the case of carrier elements with laterally projecting ribs or webs around which flow is possible, these advantageously point towards the duct wall centres or towards abutment lines of duct walls which enclose an angle.

The carrier elements are advantageously arranged in non-isogonal, slit-like flow ducts whose extension in one transverse direction is large compared to the extension in a transverse direction perpendicular thereto, e.g. greater than a factor of 3 or 5, and which preferably extend in one direction over the entire cross-section of the substrate.

The distance of the edges around which flow is possible from the duct walls, or from adjacent edges around which flow is possible, can be a fraction, e.g. one-quarter or less, to a multiple of the circumscribing diameter or the width of the carrier elements.

The substrate structure can, in particular, be designed in such a way that the Nusselt number, referred for comparison to a specific mass flow, such as is typical for automotive applications, for example, is >4.5, preferably >6 for an area of the substrate of >10 percent by volume, preferably >25%, particularly preferably >50%. In these relations, the values given refer to a diffusion distance of 0.5 mm, which corresponds to the radius in the case of flow ducts with circular cross-section, for example. In particular, Nusselt numbers of 15 can readily be achieved with ducts of large cross-section with carrier profiles for catalytically active material running parallel to the direction of flow and permitting flow around their full circumference, which can have edges around which flow is possible. In particular, the substrate can be designed in such a way that a mean Nusselt number of >4.5, preferably >6, results for it. For comparison, it can be mentioned that the Nusselt number for slit-like ducts extending over the width of the substrate is approximately 8.

The cross-sections of the ducts designed according to the invention can be arranged in such a way that they extend over cross-sectional areas of the substrate in which temperature differences of more than 10° C., preferably more than 50° C. exist during the start-up phase of catalytic converter operation. In particular, starting from the outer sides of the honeycomb, which are the coldest during the start-up phase, the ducts can extend over 25%, preferably over half of the substrate cross-section towards the centre axis or plane of the same. Catalytic converter carrier elements with edges around which flow is possible, particularly carrier elements permitting flow around their full circumference, can be provided in these areas.

Owing to the great width of the flow ducts, the catalyst coating can be thicker than in conventional substrates. For instance, with a foil thickness of approximately 5/100 mm, the coating thickness can be 5 to 25/100 mm or more, corresponding to a ratio of coating thickness to foil thickness of 1 to 5 or more. The ratio can also be >10 for special applications. This substantially reduces the sensitivity of the catalyst to catalyst poisons.

In order to increase the stability of the substrate, and thus also its resistance to thermal shocks, as well as for spacing, the carrier elements according to the invention can be inter-connected via connecting elements which extend transverse to them and can also perform a supporting function and be designed in the form of braces. The material thickness of these additional stiffening or connecting elements is preferably greater than or equal to that of the carrier elements, although it can also be less than this. The connecting elements can also be used to influence the vibrational behaviour of the carrier elements, this being of importance in the case of both changing flow conditions and vibrations externally impressed on the substrate. The elements mentioned can support the carrier elements in positive-fitting fashion and be connected to them in one piece or joined to them by material connections.

In addition, or as an alternative, to the connecting elements, which can be arranged in layers, stiffening elements may be provided which extend perpendicular and/or parallel to the carrier elements according to the invention and can be fastened in tension-absorbing fashion to a housing accommodating the substrate and/or to structural areas of the substrate that display elevated stiffness, such as partition walls and/or foil layers. Areas of elevated stiffness in the substrate can, in particular, be produced by multiple folding of foil sections or by force-absorbing connections of foil sections or other structural elements of the substrate to each other, e.g. by connecting fold legs of different foil layers making up the substrate. The carrier elements can also display points of local support on the duct walls, produced by bending or coiling.

The connecting or stiffening elements are advantageously located at zones of force application or load dissipation of the substrate to the housing or to corresponding partition and/or outer walls of the substrate, where the zones can be designed as planes.

The carrier elements around which flow is possible can be joined by means of the connecting elements and/or the stiffening elements to form structural systems that extend within the substrate over a relatively large cross-sectional area of the same, or over the entire cross-section of the substrate in at least one direction, preferably as a continuous structural system. The corresponding structural systems, which can have an isometric or elongated cross-section, can be separated by areas of the substrate with increased extensibility or reduced stiffness, as a result of which the stiffness as a whole, and thus also the resistance to thermal shocks, as well as the vibrational properties of the substrate, can be adapted to the prevailing requirements. The expansion zones can, in particular, divide the substrate transverse to the flow paths. The extension of the carrier elements interconnected to form a structural system transverse to the flow paths is advantageously a multiple of the distance between adjacent carrier elements.

The respective connecting or stiffening elements can loosely support the carrier elements according to the invention or be fastened to them by suitable jointing techniques, particularly by non-positive, positive or material connection, where connection of the elements capable of absorbing tensile forces can already be achieved by applying the coating material or by integral moulding of the elements in one piece. The use of twisted, wire-shaped carrier elements is also suitable for this purpose.

The connecting elements and/or stiffening elements can, for example, be designed in the form of wires, webs, strips or panel-like smooth or profiled foil sections. In particular, the carrier elements according to the invention, as well as the connecting and stiffening elements, can be designed in the form of expanded-metal layers, this resulting in an integrated component for producing the substrate. On the expanded-metal layers within the meaning of the invention, the sections produced by making cuts in the foil layers can be shifted parallel and/or perpendicular to the foil layers and, if appropriate, the required profiles can subsequently be produced by deformation, particularly compression. The cuts can, for example, be made parallel to each other in foil layers that are either plane or structured, e.g. corrugated or folded in zig-zag fashion, where a variety of carrier structures can be produced, e.g. as single or multiple-wall structured walls, web-shaped carrier elements or structured profiles.

The carrier elements, particularly in the form of expanded-metal layers or foil layers with integrated fold webs, can rest on adjacent foil layers or be separated from them, where the respective layers can be stabilised by stiffening elements extending in the perpendicular or parallel direction, these possibly being indirectly or directly connected to the carrier elements according to the invention. To this end, the expanded-metal layers or foil layers can also have areas of different height, curvature or twisting, so that the adjacent foil layers rest on the expanded-metal layers at some points and, at other points, display edges a distance away from these, around which flow is possible.

The face ends of the carrier elements according to the invention are advantageously connected to each other, particularly those carrier elements that are located at different heights of the substrate in installed condition. According to a particularly preferred configuration of the substrate, expanded metal in which the corresponding carrier elements are formed is used for this purpose, the expanded metal being laid in meandering fashion.

In order to construct the substrate, carrier elements with edges around which flow is possible can also be arranged between plane or structured, continuous foil layers, where the foil layers are at a distance from the carrier elements on both sides or rest on the carrier elements on one or both sides. The carrier elements can be designed as continuous profiles in this context.

In order to manufacture a catalytic converter, the prefabricated substrate can be provided with a catalytically active coating, which includes coating a substrate material, in prefabricated condition. Alternatively, previously coated carrier elements can also be assembled to form a substrate.

The individual layers of carrier elements or foil layers, of which the substrate is constructed, can be arranged in congruent fashion or with a lateral or longitudinal offset.

The use of carrier elements for the catalytically active coating material, which have edges around which flow is possible, permits the construction of substrates which display a very open structure over relatively large volume areas, with a large number of adjacently arranged carrier elements without partition walls preventing gas exchange transverse to the flow paths in a common gas plenum. This permits greater uniformity of the velocity and temperature distribution, as well as of the material composition of the fluid medium, and/or produces a substrate with a smaller volume but equal efficiency. On the outside, the common flow chamber is surrounded by the housing wall or by partition or stiffening walls of the substrate, which can also be located inside the same. The volume areas with gas plenum advantageously extend in two directions transverse to the flow paths that are essentially perpendicular to each other and enclose a number of edges around which flow is possible (i.e. three or more) in one or both directions. The areas of the structure through which free flow is possible can alternate in the longitudinal and/or transverse direction of the substrate with areas in which the fluid medium is guided in flow ducts having lateral walls. The volume of the open areas of the structure compared to that of the areas with edges around which flow is possible, or with side walls that prevent an exchange of medium, can be dimensioned such that the proportion of the total catalytic efficiency of the open areas of the structure on the substrate is not negligible, e.g. accounts for 5% to 25% or more of the total efficiency, preferably more than 50% to 100% of the total efficiency. In particular, the open areas of the structure can occupy volumes which, separately or in their entirety, exceed the individual or total volumes of areas of the substrate that display ducts through which flow is possible or no edges around which flow is possible. The open structure of the carrier elements according to the invention can, in particular, also extend over the entire substrate, or be located in the front area of the substrate as seen in the direction of flow, so that a longer flow path of the medium with reduced structural mass results in a faster warm-up rate of the substrate and thus in improved start-up behaviour of the catalytic converter. Apart from the substrate areas with open structure described here, a housing, particularly in the same substrate, can be provided with substrate areas of different structures in the direction of flow and/or in a direction transverse thereto, particularly ones with a different number of shape of carrier elements and/or a different duct cross-section or distance from the side walls. These can serve as fastening areas for the carrier elements located in the open areas of the substrate and, for example, delimit the open areas at both face ends.

The carrier elements with edges around which flow is possible are preferably arranged relative to each other in such a way that, relative to a substrate outer surface around which flow occurs, the nearest adjacent substrate outer surface displays a specified minimum distance in the direction of the surface normal, e.g. 1.5 times, preferably more than twice the distance of the shortest distance between substrate surfaces of adjacent carrier elements. The distance can refer both to opposite surface areas and to opposite edges and surfaces. The adjacent substrate surfaces located within the specified minimum distance are preferably oriented in such a way that the surface normals enclose an angle of more than 90°, preferably more than 120°. As a result of this arrangement, the centre-of-gravity axes of the carrier elements are at the same time offset in the direction of the substrate height relative to the longitudinal central axes of the flow paths with the highest flow velocity, which correspond to the centres of pressure. The result of this is that vortices forming on the substrate surfaces due to gas friction are not each opposite a counter-vortex rotating in the opposite direction on a substrate surface, where the surfaces comply with a specified minimum spacing. The substrate structure thus obtained has particularly high conversion rates.

For adaptation to specific requirements, the substrate can display several areas at a distance from the face ends, and thus from the inlet and/or outlet areas, in the direction of flow, these each extending laterally over one or more carrier elements, where at least two of these areas display different structures. The structured areas can, in particular, display slit-like ducts or be designed to be permeable to the medium in two directions transverse to the flow paths, e.g. in the form of open substrate structures with gas plenum. These areas can be arranged one behind the other in the direction of flow. The structure, which can refer to the arrangement, the edge direction and/or the connection of the carrier elements and other components, such as stiffening elements or connecting elements, can, in particular, bring about different extensibility properties and/or flow resistances or flow path lengths transverse and/or longitudinal to the flow paths.

A particularly advantageous configuration of a substrate is one in which several mixing zones (including the inlet and outlet zones), where mixing primarily takes place, alternate with several reaction zones, where a reaction primarily takes place. The substrate thus preferably displays at least two or more, for example ten or more, reaction zones separated by mixing zones. In this context, the substrate can also be assembled from several individual elements, each of which engages the face ends of an adjacent substrate, thus forming a continuous flow chamber. The ratio of the sum of the lengths of the reaction zones to the sum of the lengths of the mixing zones is >2, preferably 5 to 20 or more. In this context, the length of the comparatively short mixing zones can be 2 to 20 times the gap width or height of the flow ducts. The mixing zone and the inlet zone are characterised in that vortices are produced in them and that the flow resistance is thus essentially determined by the form resistance and extensive deflection of the flow filaments exists as a result of obstacles to flow. To this end, the flow cross-section can, for example, be provided with profiles running at an angle to the direction of flow, such as webs of expanded-metal layers, inlet profiles, wires or the like, the surfaces of which against the medium flows running at an angle of >15°, preferably 45 to 90°, relative to the direction of flow. However, both with angled inflow into the substrate and with inflow in the longitudinal direction of the same, a high form resistance is also generated by the duct structure of the substrate in the inlet area owing to the abrupt transition from turbulent to laminar flow and the vortices developing as a result, without having to provide flow-deflecting baffle plates or the like for this purpose. In contrast, the reaction zones are characterised by a high frictional force component in the flow resistance, the result being that micro-turbulence zones are present here. In these zones, the carrier elements preferably run parallel to the longitudinal direction of flow, or at an angle of up to approximately 10°.

An abrupt transition in the inlet area would result in excessive inlet throttling losses and, consequently, in a loss of passive heating capacity from the heat and flow energy content of the fluid stream, which would be lost for effective heating of the inlet zone. Therefore, means for reducing the heat transmission resistance are advantageously provided in the inlet zone, e.g. in an extended inlet zone in the form of axially elongated deflectors, by geometrical angling of the flow inlets and/or by supplementary transverse elements located there, such as wires and the like, which are advantageously located even before the start of the flow ducts. The product of surface areas and heat transmission coefficients is reduced as a result. Consequently, the catalytically active material in the inlet area becomes better usable in the heating process comprising exhaust-gas heat input and the exothermic chemical reaction, and conversion become effective more rapidly during start-up operation, as the heat transmission can be exploited axially deeper into the inlet zone.

Taken as a whole, the ratio of the form resistances of the mixing zones to the frictional resistances of the reaction zone can be 2.5 or more, i.e. the pressure loss in the mixing zone, referred to a unit length, is 2.5 or more times the pressure loss under the flow conditions prevailing in the reaction zone. In this way, a substrate is created which has several zones with substantially different functions, where strong transverse mixing occurs in the inlet and mixing zones owing to accelerated flow and vortex formation, where micro-vortices or shear vortices occur more in the reaction zones owing to static friction.

On a substrate provided with a housing, the housing can be designed in such a way that, starting from the upstream end of the substrate, it is a distance away from the latter on one or several sides, meaning that the fluid medium can flow into the substrate not only from the face end, but also from the side. In order to prevent the medium from flowing straight past the side of the substrate, appropriately arranged guide vanes can be provided that ensure that the fluid medium flows into the substrate from the side a specified distance away from the face end. Particularly if the housing is provided with an inlet pipe whose cross-section is smaller than the substrate cross-section, these measures can achieve a more uniform distribution of velocity. A substrate arrangement of this kind advantageously has a downstream substrate with slit-like or tubular flow ducts which displays a narrower flow cross-section and which, in turn, may be followed by a downstream substrate permitting lateral medium inflow or outflow.

BRIEF DESCRIPTION OF THE DRAWINGS

FIG. 3 shows a section of a substrate with foil layers displaying fold ribs.

FIG. 4 shows a section of a foil layer with fold ribs.

FIG. 9a shows a section of a substrate consisting of structured foil strip.

FIG. 9b shows a section of a substrate wherein the fold edges are provided with fold ribs.

DETAILED DESCRIPTION OF THE INVENTION

An example of the invention is described below and explained on the basis of the figures.

Figure 1:
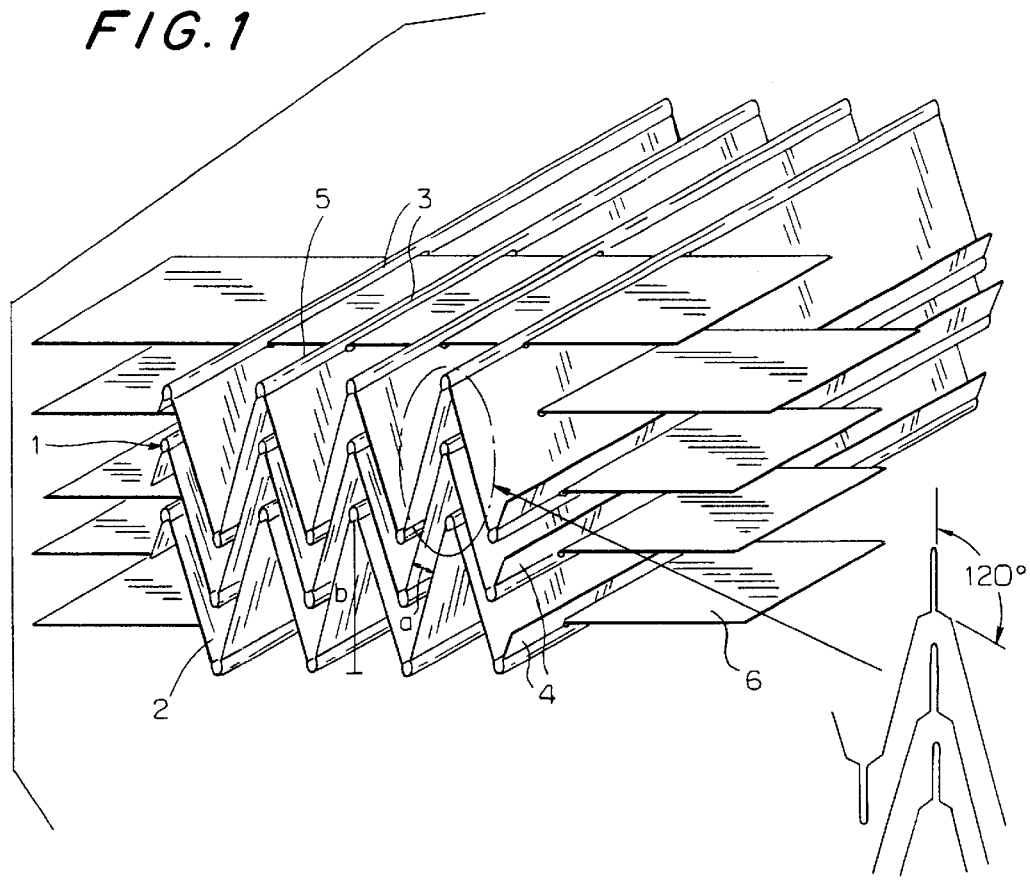
FIG. 1 shows a substrate constructed of individual foil layers.

FIG. 1 shows a section of a substrate constructed of individual foil layers 1, laid in congruent fashion relative to each other, where the height h of the foil layers is substantially greater than the distance a between the foil layers. Zigzag-shaped flow ducts 2, extending over the entire width of the substrate, are enclosed between the foil layers. At the folds, foil layers 1 display fold ribs 3, which extend parallel to the direction of flow of a fluid medium directed through the substrate and whose flanks are steeper than the adjacent areas of fold webs 4 of the foil layers, so that the middle free edges 5 of fold ribs 3 project into flow ducts 2. As shown in detail on the right in FIG. 1, the flanks of fold ribs 3 enclose an angle of 120° with the adjacent areas of fold webs 4, where the more distant areas of the fold webs are more strongly angled relative to ribs 3. It should be emphasised at this point that the edges that extend along the flow ducts and around which flow is possible can also already be formed by the fold edges of zigzag-shaped foil layers 1, which then limit the flow ducts at the height of fold webs 4.

In order to stabilise the substrate, stiffening elements are provided in the form of strips 6, which pass through the foil layers immediately below and above fold ribs 3 and in the middle of fold legs 4. Fastening of strips 6 to foil layers 1 in a manner capable of absorbing tensile forces is accomplished by coating with a catalyst material up to a thickness exceeding the diameter of the foil feed-throughs. The free ends of strips 6 can each be fixed to a housing, for which purpose the ends of strips 6 are, in particular, folded over and the fold webs connected to each other, where the end areas of the resultant side wall can be fastened to a housing.

Figure 2A:
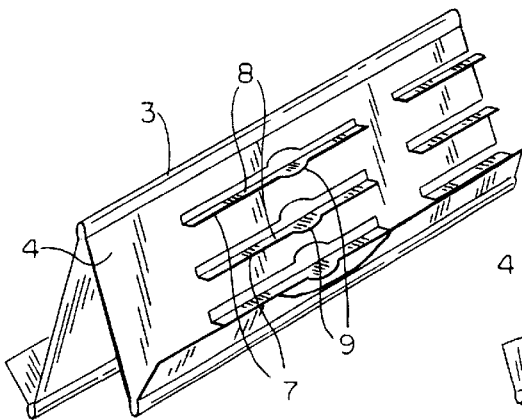
FIG. 2 shows a substrate having foil layers having notched, single-walled webs.
Figure 2B:
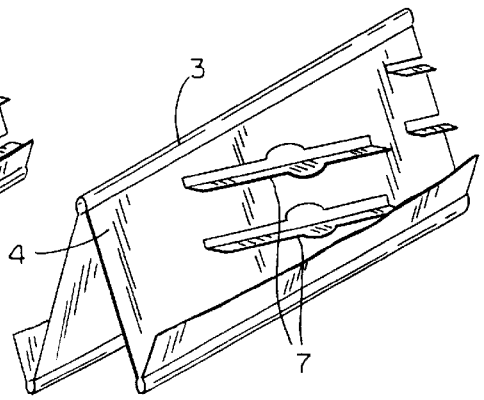

According to FIG. 2, in addition, or also as an alternative, to double-walled fold ribs 3, fold webs 4 of the foil layers can be provided with notched, single-walled webs 7, which extend in the longitudinal direction of the flow ducts, such that a fluid directed through the flow ducts can flow around free edges 8 of webs 7. In this context, webs 7 are arranged in rows and aligned with each other although, as shown on the right in FIG. 2, they can also be inclined relative to the longitudinal direction of the flow ducts so that, given orientation in the same direction, an extension of the flow path and automatic flow deflection over the cross-section of the honeycomb can take place. Webs 7 are provided with projections 9 in the middle, which rest on the adjacent foil layer, thereby stabilising the layer structure as a whole and the position of edges 8, which are located roughly in the middle of the flow ducts. Adjacent sections of adjacent foil layers can also be provided with webs which point in the direction of the opposite foil layer and intermesh in the manner of a comb.

The distance between webs 7 in the longitudinal direction of the flow ducts is small compared to the web length, so that, in total, webs 7 extend over the greater part of the length of the flow ducts. An arrangement that is particularly effective in catalytic terms is created by the fact that several webs 7 are provided one above the other on each of the fold webs.

FIG. 3 shows a section of a substrate with an arrangement of foil layers 10 displaying fold ribs 11 projecting into the interior of flow ducts 10a, as per the arrangement in FIG. 1.

In contrast thereto, however, the height of the foil layers is roughly equal to the distance between them. In order to stabilise the honeycomb structure, stiffening wires 12 are provided, which are inserted into indentations 13 of fold ribs 11 of both adjacent foil layers 10, thereby defining the distance of the foil layers from each other and preventing their longitudinal displacement relative to each other. At the same time, stiffening wires 14 are provided, which pass through foil layers 10 at the position of indentations 13, thus limiting the lateral displacement of the foil layer fold or fold ribs relative to each other. Twisting stiffening wires 12, 14, or coating them, allows them to be connected to each other and to foil layers 10 in a manner capable of absorbing tensile forces. Stiffening wires 12, 14 are located in the inlet and outlet area of the substrate, where the flow conditions of the fluid medium tend to be more turbulent, thus particularly stabilising the inlet and outlet areas, which are exposed to greater flow forces. The stiffening wires can also be provided within the substrate in load-conducting or load-dissipating planes.

FIG. 3 furthermore indicates that the height of the point of penetration of the stiffening elements on fold webs 15 of foil layers 10 permits variation of the distance between the latter and thus the height of the flow ducts. The zigzag-shaped foil layers can also be laterally compressed to this end.

FIG. 4 shows a section of a foil layer 16 with fold ribs 17, whose upper edge 18, around which flow is possible, is located approximately in the middle of the flow duct enclosed between opposite foil layers. In this context, the foil layers are stabilised by tabs 20, notched out of fold webs 19, which are notched out of fold ribs 17 on both sides here, rest against each other above the same, and the free end 21 of which is fixed in the fold rib of the foil layer above. In this context, fixing can be achieved by clamping, coating or by means of a positive connection, e.g. by means of a stiffening wire passed through the stiffening rib and free end 21 of tab 20. The face edges of foils 16, particularly at the height of fold ribs 17, and tabs 20 are reinforced by double walls.

Connecting tabs 21 to the foil layer above thus form one-dimensional or isolated joints for stabilising the catalytic converter substrate. The joints can, as indicated in FIG. 4, be located one above the other, such that one-dimensional stiffening zones extending over the entire height of the substrate result. If appropriate, however, the individual joints of an area extending over the height of the substrate can also be provided only on every second or third foil layer, this allowing the stiffness of the substrate to be varied. The joints provided can also be offset in the longitudinal direction of the flow ducts, or arranged in such a way that joined and unjoined fold ribs alternate along the height and width of an area of the substrate. Finally, the fold ribs in a given area of the substrate can also be arranged in random fashion. Taken as a whole, this results in the formation of areas of the substrate that have increased stiffness which can be delimited by continuous areas without joints and with increased extensibility.

Figure 5A:
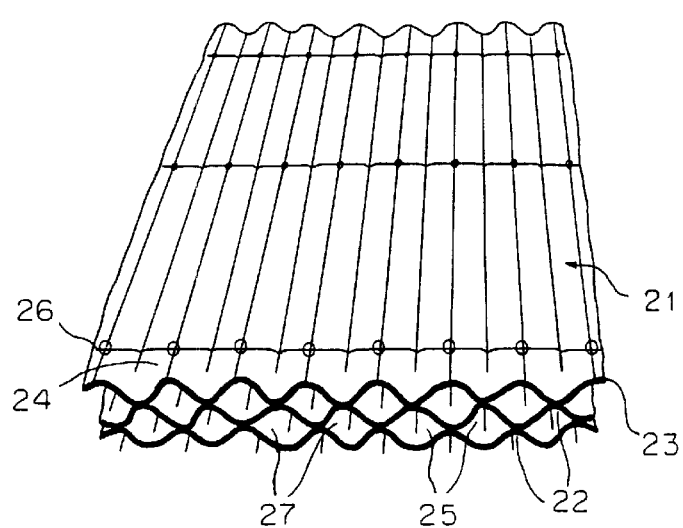
FIG. 5 shows a section of a substrate with a foil strip.
Figure 5B:
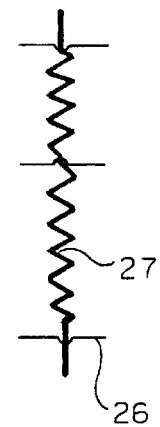

FIG. 5 shows a section of a substrate with a foil strip 21, laid in meandering fashion, where wire meshes 24 are inserted between the individual foil layers 23, which are connected to each other via connecting webs 22, located at the face ends. Stiffening wires 26, which run transverse to the tubular and roughly circular flow ducts 25, are inserted in indentations in the foil corrugations in such a way that wires 27, running in the longitudinal direction of the flow ducts, are positioned in the middle of flow ducts 25, where the wires can alternatively also be bent or twisted, as indicated on the right in FIG. 5.

Wires 26 can be connected to wires 27 by spot-welding or soldering methods, or wires 26, 27 can also be loosely interlaced. In the arrangement illustrated, wires 27 permit flow around their entire circumference in their longitudinal direction. Together with the duct wall surrounding them, they likewise represent an alternative configuration of carrier surfaces and edges around which flow is possible within the meaning of the invention, where the edge or edges in this design is or are located or formed on an adjacent component of a different kind.

As an alternative, or in addition, the respective ends of wires 27 can also be retained by foil sections running transverse to the ducts, these being fastened to or adjacent to connecting webs 25 or to the foil layers. These foil sections can also be designed as inserts that are inserted into the face ends of the ducts.

Figure 6:
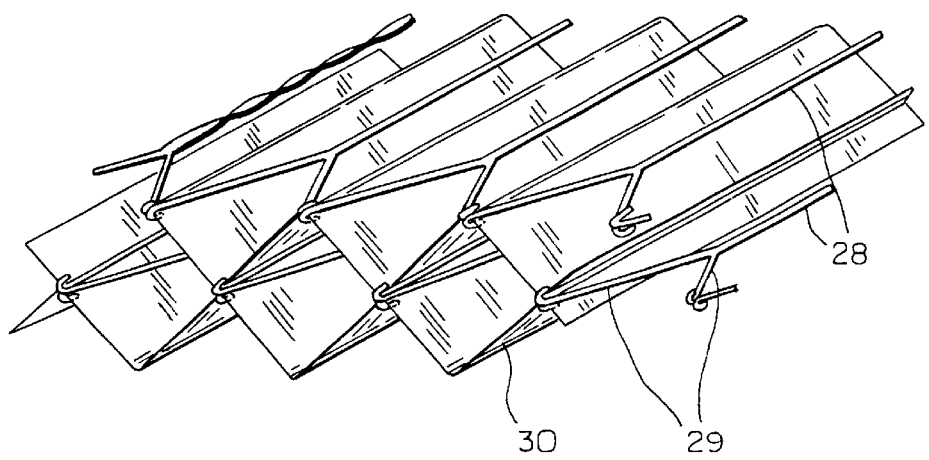
FIG. 6 shows a configuration in which webs are located in the middle of square flow ducts.

FIG. 6 shows another configuration, in which webs 28 are provided that are located in the middle of the essentially square flow ducts and run in the longitudinal direction of the same. The end areas of the webs are split, so that the two end pieces 29 of webs 28 are connected to each other and to the foil layers at the points of contact of adjacent foil layers 30 by beading the free ends. All or some of the webs can, possibly in some areas, be twisted along their longitudinal axes, as indicated by way of example on the left in the figure, as a result of which two edges with helical profile around which flow is possible are produced. The arch-shaped edges can also have a different profile, e.g. spiral-shaped or corrugated.

Figure 7A:
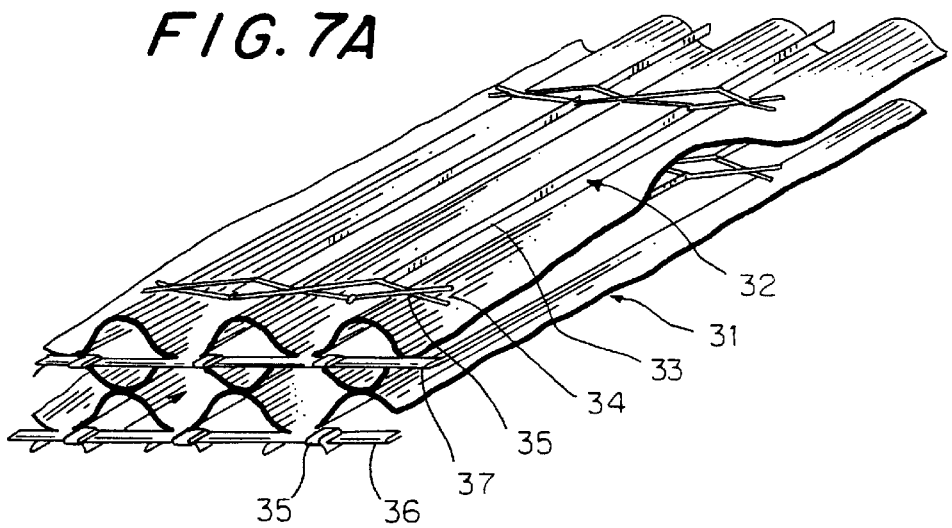
FIG. 7a shows a section of a substrate in which expanded-metal layers are inserted between the individual foil layers of corrugated foil strip.

As another configuration of the practical examples illustrated in FIGS. 5 and 6, FIG. 7a shows a section of a substrate in which expanded-metal layers 32 are inserted between the individual foil layers of corrugated foil strip 31, which is laid in meandering fashion. The expanded-metal layers display longitudinally oriented, two-edged webs 33, which are located in the middle of the flow ducts, that are roughly circular in this case, and which are connected to each other via intersecting and integrally moulded connecting webs 34 to form a layer. Connecting areas 35 of connecting webs 34 are inserted in indentations in foil layers 31. The rhombic arrangement of connecting webs 34 produces expansion areas within the expanded-metal layers that are capable of absorbing changes in length, e.g. resulting from temperature fluctuations, longitudinal and transverse to webs 33. Intersecting webs 34 can be fastened to the housing wall or to a partition wall running through the substrate, an expansion area opposite the housing or the partition wall being formed as a result of the V-shaped arrangement of the connecting webs. Moreover, webs 34, arranged in V-shape, prevent slipping of the foil layer corrugations relative to the expanded-metal layer transverse to the flow ducts, this additionally stabilising the substrate.

The foil layers of foil strip 31, which is laid in meandering fashion, are limited and connected to each other at their face ends by fold web 36, which is produced by punched holes and shortened by fold 35, where fold web 36 extends over the entire width of the substrate. Stiffening wires 37 are clamped in fold web 36 for additional stabilisation. Moreover, fold web 36 increases the catalyst surface in the area of turbulent flow of the inflowing fluid medium, and can simultaneously serve as a flow guide if angled relative to the principal plane of the foil layers.

Figure 7B:
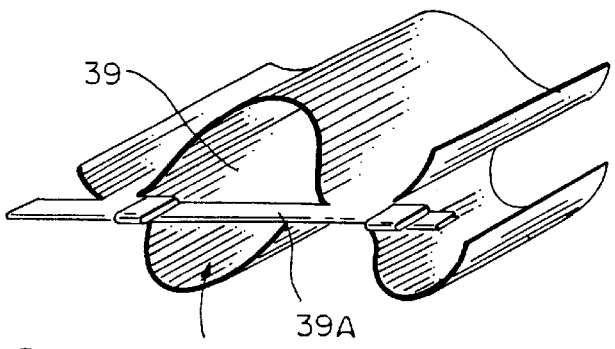
FIG. 7b shows a substrate in which the inlet area of the flow ducts runs at an angle to the face end of the substrate.

Given an appropriate shape of the punched holes, inlet area 39 of the flow ducts can, as illustrated in FIG. 7b, run at an angle to the face end of the substrate of be of V-shaped design, as a result of which the axial length of the turbulence zone and the flow conditions in the inlet or outlet area can be adapted to the inflow angle of the fluid medium or its degree of turbulence.

Figure 7C:
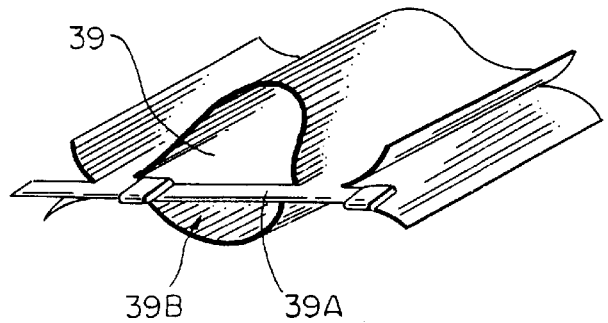
FIG. 7c shows a substrate with horizontal webs and inclined areas.
Figure 7D:
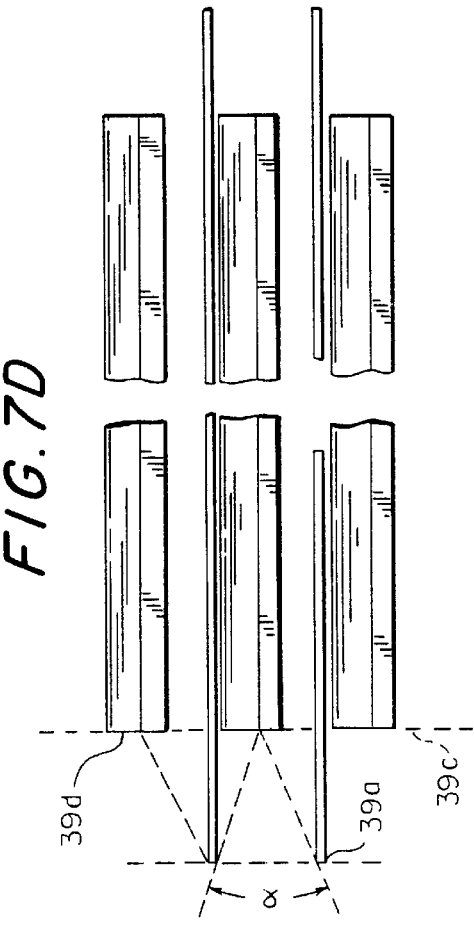
Figure 7F:
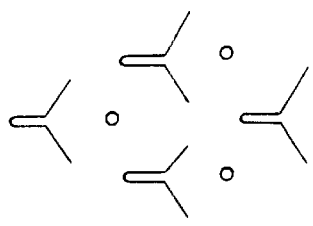
Figure 7E:
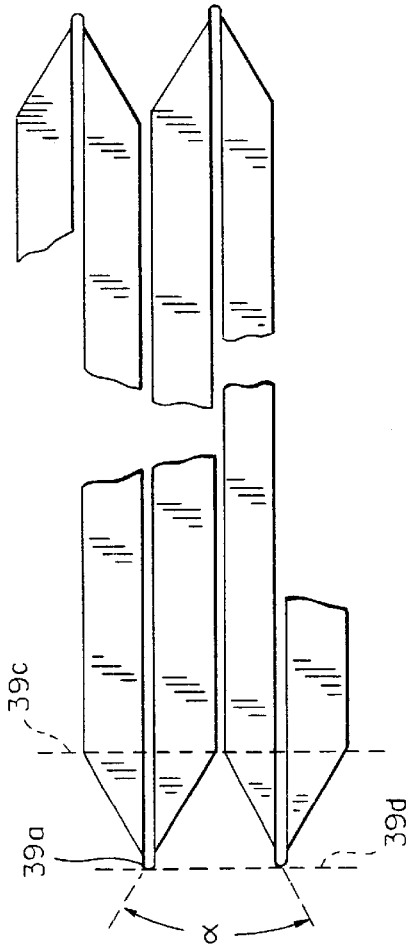
Figure 7G:
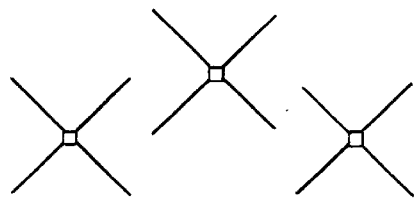

Generally speaking and as illustrated in the examples in FIGS. 7a, 7b and 7c, horizontal webs 39a and inclined areas 39b thus provide means upstream or downstream of the inlet and/or outlet area of a structural body (cf. also FIG. 9a, bevel 51, and FIG. 12, rods 68) that protrude axially in front of honeycomb or structural body face ends 39c (see FIG. 7c) and bring about flow deflection of the medium in relation to the principal direction of flow within the structural body or its longitudinal direction. Flow deflection can, for example, take place in the manner of a macroscopic change in the direction of flow or also, for example, in the manner of swirling, as at the front or deflecting edges 39a of the cuts in FIGS. 7a to c. The means can be separately assigned to each flow duct or flow path. The dimensions of the means in the direction of flow can be small compared to the length of the structural body, e.g. in the region of several times (e.g. 10), or less than, the diameter of the duct or flow path. There is thus a continuous or stepwise change in the flow conditions by structural elements in the inlet area of the structural body, starting from the face-end envelope 39d of the projecting flow deflectors and extending over a certain depth which can, for example, correspond to 0.5 to 10 times (without limitation) the width of the flow ducts or the distance between the core flows, i.e. the flow paths with the highest flow velocities. The means can be integrally moulded on the foil layers, e.g. by the cuts described above, or produced by the axial elongation of structured or plane foil layers, or designed as separate components, e.g. in the form of axially extending wires. The means can be arranged concentrically in relation to the flow ducts or flow paths with the highest flow velocity, or also between these. The axial projection of the flow deflectors refers to the face end or the face-end envelope 39e of the honeycomb, which defines the start of the individual flow ducts or flow paths, which arise from the splitting of the overall flow hitting the structural body into component flows, in the inlet area of the structural body.

The projecting means can thus correspondingly also be provided on honeycombs having a conically shaped face end, which can be produced, for example, by telescoping a coiled strip. In particular, the means can, if appropriate, also be realised on structural bodies without stiffening elements according to the invention, and also, if appropriate, on structural bodies with partially or completely unobstructed fluid exchange in one or two transverse directions. The free ends of the projecting areas can enclose an angle of between 150° and 20°, preferably 90° and 30°, with the face-end area lying centrally between them.

Figure 8:
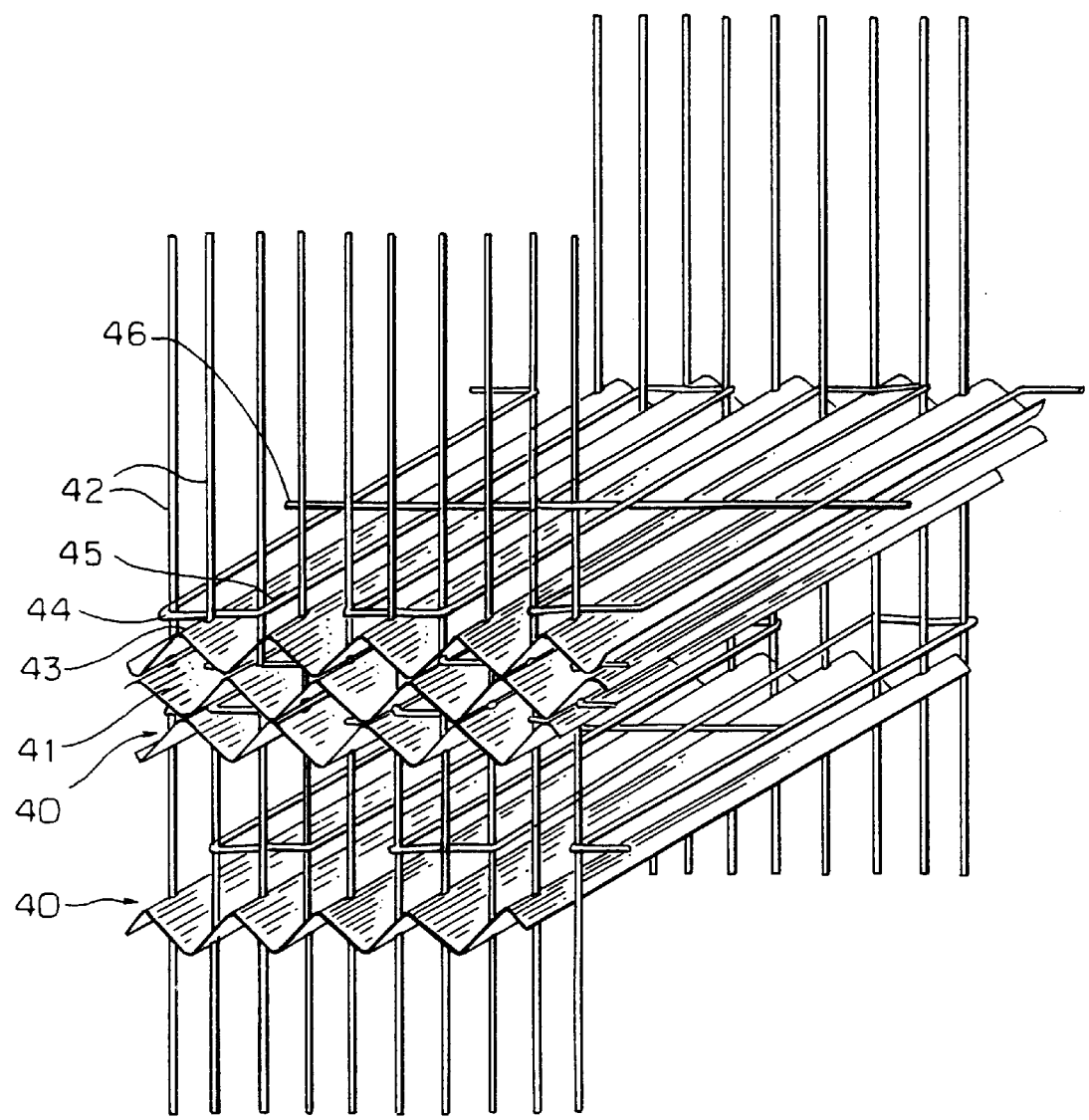
FIG. 8 shows a section of a substrate with foil layers arranged opposite each other.

FIG. 8 shows a section of a substrate with foil layers 40 arranged opposite each other, by which tubular and approximately square flow ducts 41 are formed. The foil layers are laterally stabilised relative to each other by stiffening wires 42, which are passed through corresponding feed-throughs in fold edges 43 of the foil layers and extend over the entire height of the substrate. Arranged between foil layers 40 are wrapped around stiffening wires 42 are zigzag-shaped wires 44, whose areas 45 are positioned in the middle of the flow ducts as edges around which flow is possible and which can, if appropriate, be extended in helical fashion, at least in some areas, in order to intensify the catalytic reaction. Wires 46 are woven into middle areas 45 of wires 44 for further stabilisation of the substrate.

As can moreover be seen from FIG. 8, the substrate can be manufactured by alternately threading foil layers 40 and the lattice-like layers of wires 44, 46 onto stiffening wires 42, which are oriented parallel to each other.

FIG. 9a shows a section of a substrate consisting of structured foil strip 47, laid in meandering fashion, where punched holes in the face-end fold areas create inlet openings 48 for a fluid medium, in which context webs 49, which connect the foil layers to each other, are left between the punched holes. Pretensioned stiffening wires that connect the foil layers to each other are clamped in V-shaped webs 49 over the height of the substrate. For flow deflection in the case of angular inflow into the substrate, the face-side ends of channels 50 are provided with bevels 51, angled towards the face end, which bring about scoop-like deflection of the incoming medium that, in this case, reduces swirling of the medium in the direction of flow.

The structure of isolated expanded-metal layers 52, located between the individual foil layers, and their orientation relative to the foil layers correspond to those shown in FIG. 7. The intersecting connecting webs 53 of expanded-metal layers 52 are connected to lateral fold legs 54 of the foil layers, which are joined to form virtually gas-tight side walls, in that the ends of the connecting webs are passed through feed-throughs in the fold legs and beaded on the outside. As a result, the expanded-metal layers are fixed to a partition or outer wall of the substrate, where the V-shaped arrangement of connecting webs serves to compensate for expansion in the event of temperature fluctuations.

As shown in FIG. 9b, the upward and downward-pointing fold edges of the foil layers are provided with fold ribs 55 to form triangular channels 50 with face-end bevels 51, as well as V-shaped connecting webs 49. These fold ribs, around which a fluid can flow, likewise represent edges around which flow is possible on the foil layers, these increasing the efficiency of the catalytic converter in the slit-like ducts, together with the edges of the expanded-metal webs around which flow is possible.

Figure 10:
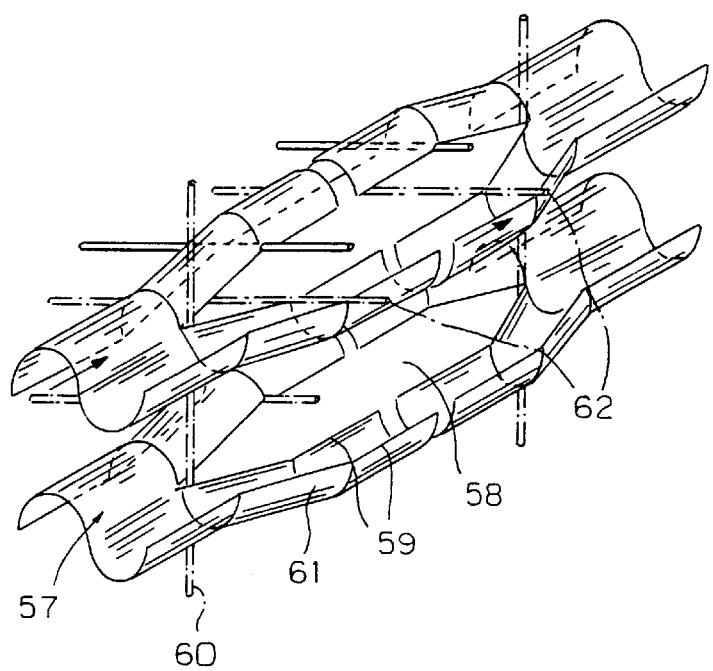
FIG. 10 show a section of a substrate consisting of corrugated foil layers.

FIG. 10 shows a section of a substrate, consisting of corrugated foil layers 57, on which individual channel-shaped or semi-circular, free-standing profiles 61, produced by parallel cuts 58, are alternately deflected upwards or downwards perpendicular to the foil layers. The individual foil layers or profile layer sections are laid in congruent fashion relative to each other, resulting in a system or bundled arrangement of profile webs 61 at staggered heights in the axially central area. The catalytically active edges 59 of profiles 61 run parallel to the direction of flow of the fluid at cuts 58. To stabilise the substrate, wires 60, arranged perpendicular to foil layers 57 and located in the ends of cuts 58, are provided, which are clamped in the gusset between upward and downward-deflected channel-shaped profile webs 61 and can extend over the entire height of the substrate. Vertical wires 60 are additionally fastened on foil layers 57, and horizontal wires 62 on profiles 61, as a result of the thickening caused by the coating or using appropriate positive-fitting means.

Deflected channels 61, with edges 59 around which flow is possible, are supported or borne by additional stiffening wires 62 running transverse to these, which are provided at the ends of the horizontal sections and in the middle areas, the height of the individual webs being fixed in this way. In all, cuts 58 permit an exchange of a fluid medium both in the transverse direction and over the height of the substrate. As a result, a bundle of profiles in a continuous gas plenum is created in the middle area. During flow through a substrate of this kind, division and separation into numerous flow slits initially takes place in the inlet area. The slit walls are then transformed into numerous profiles, around which undivided flow is possible and which are surrounded by a continuous gas plenum, downstream of which the flow is again divided over separate slits in the outlet area. The circumference of the middle gas plenum is surrounded on the outside by the substrate housing, not shown here. In this context, the substrate can be fastened to the housing both via stiffening wires 60, 62 and via transverse corrugated strip sections 57.

Figures 11, 11A:
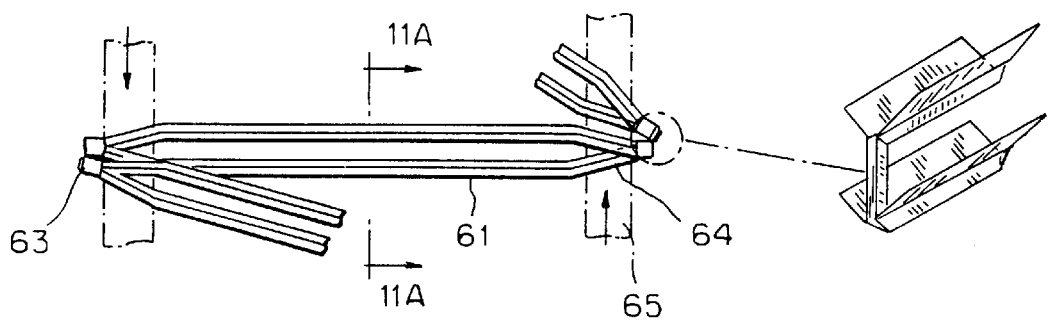
FIG. 11 is an enlarged section of FIG. 10 showing channel-shaped profiles.

As indicated in FIG. 11 on the basis of an enlarged section, channel-shaped profiles 61 can, in accordance with the principle of FIG. 10, extend over virtually the entire length in the middle area of the substrate, where foil strip 63, laid in meandering fashion, three layers of which are shown here, is stabilised by intersecting strips 65, located in bent or folded sections 64. In addition, layers of wires or strips can also be provided in accordance with the configuration in FIG. 10, these being connected or joined together, for example, or loosely woven. At the two face ends, profile layers 61 of the middle substrate area merge in one piece into profile strip sections 63 in this case, these in turn being connected layer-by-layer by webs in accordance with item 49 in FIGS. 9a, 9b.

Figure 12:
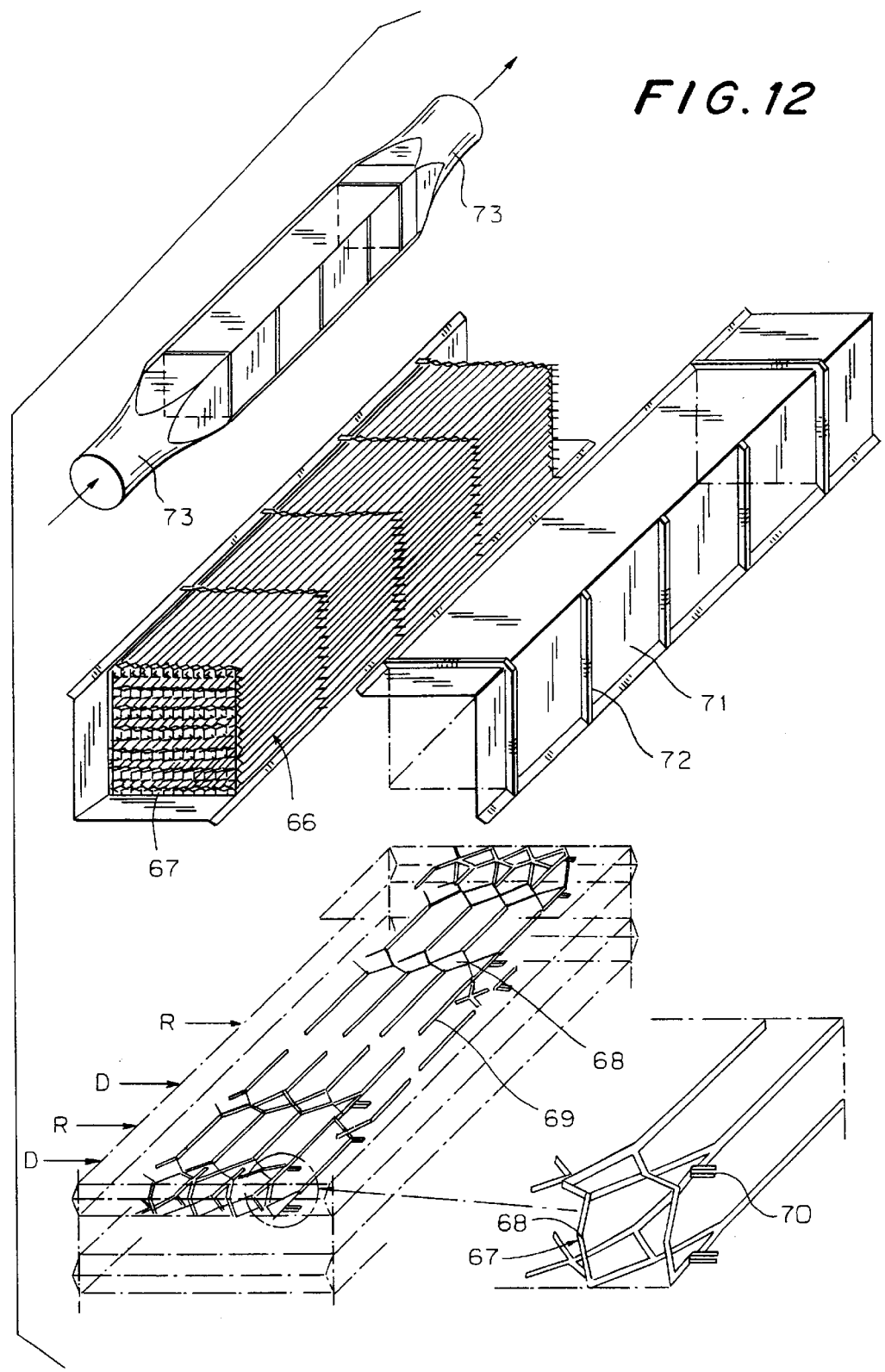
FIG. 12 shows the substrate constructed as a profile bundle.

As indicated by FIG. 12, the entire substrate 66 can be constructed exclusively as a profile bundle where, according to the practical example, the profiles are formed from an expanded-metal strip laid in meandering fashion, where deflection areas 67 are formed by webs 68 bent in U or V-shaped fashion. Webs 69 have four edges around which flow is possible. Depending on their cross-sectional size and design, the individual edges of the webs formed from slitted foil can act jointly as a single edge, or as two edges in the case of broader webs or profiles, and even separately as four edges given a large film thickness, provided that enough plane surface still remains between the edges. As explained in connection with FIG. 6, the webs or profiles can again be slightly twisted or bent here, in order to increase the turbulence at the edges and surfaces and thus improve the efficiency. In order to stabilise the substrate, laterally projecting tabs 70 are provided on extensible connecting areas 68 of webs 69, which permit flow around their full circumference. As shown in the middle of FIG. 12, the substrate can be located in a housing comprising two half-shells 71 and fastened by clamping tabs 70 in housing beads 72.

The substrate shown displays a substrate structure that is open and permeable to a medium in both the transverse and vertical directions, which permits homogenisation of the composition and the velocity distribution over the cross-section of the substrate in the gas plenum that thus completely surrounds it in undivided fashion. This is also particularly advantageous if changes in cross-section and non-uniform flow loads occur in the area of inlet and outlet pipes 73. Owing to the cross-sectional differences between inlet and substrate cross-section that usually exist, this is always a problem, which is why a bundle structure of this kind is always advantageous. The outer circumference of the gas plenum is surrounded by housing 71 on the outside. If desired, a substrate with a structure open on all sides, such as that shown in FIG. 12, can also be provided only in the inlet or outlet area of a substrate having a different structure.

The substrate according to FIG. 12 thus consists of a serial arrangement of several short mixing zones D with high flow form resistances, where these zones also include the inlet and outlet zones, alternating with reaction zones R located between these, in which the flow resistance is essentially determined by the static friction effect with the duct walls or catalyst carrier elements. The substrates in FIGS. 13 and 15 also display a corresponding zoned structure. The inlet zone is, or can be, designed appropriately to maximise the product of surface area and heat transmission coefficient.

Figure 13:
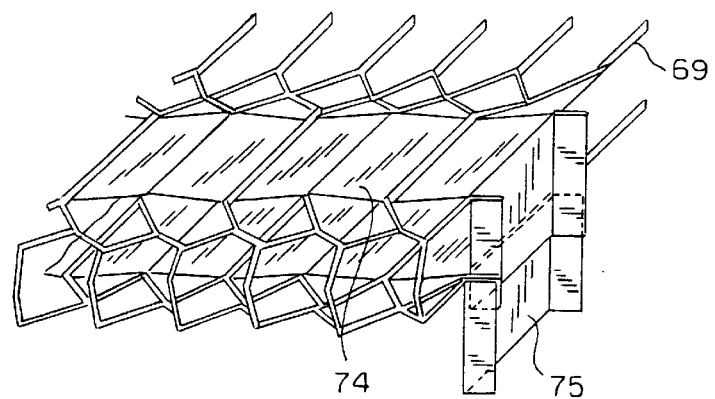
FIG. 13 shows stabilizing of a substrate according to FIG. 12.

FIG. 13 shows how a substrate according to FIG. 12 can be additionally stabilised by weaving in stiffening strips 74 transverse to webs 69. The strips of different layers overlap each other in order to form flexible side or partition walls 75 and are provided with laterally projecting strip sections that can be fixed to a housing.

Figure 14:
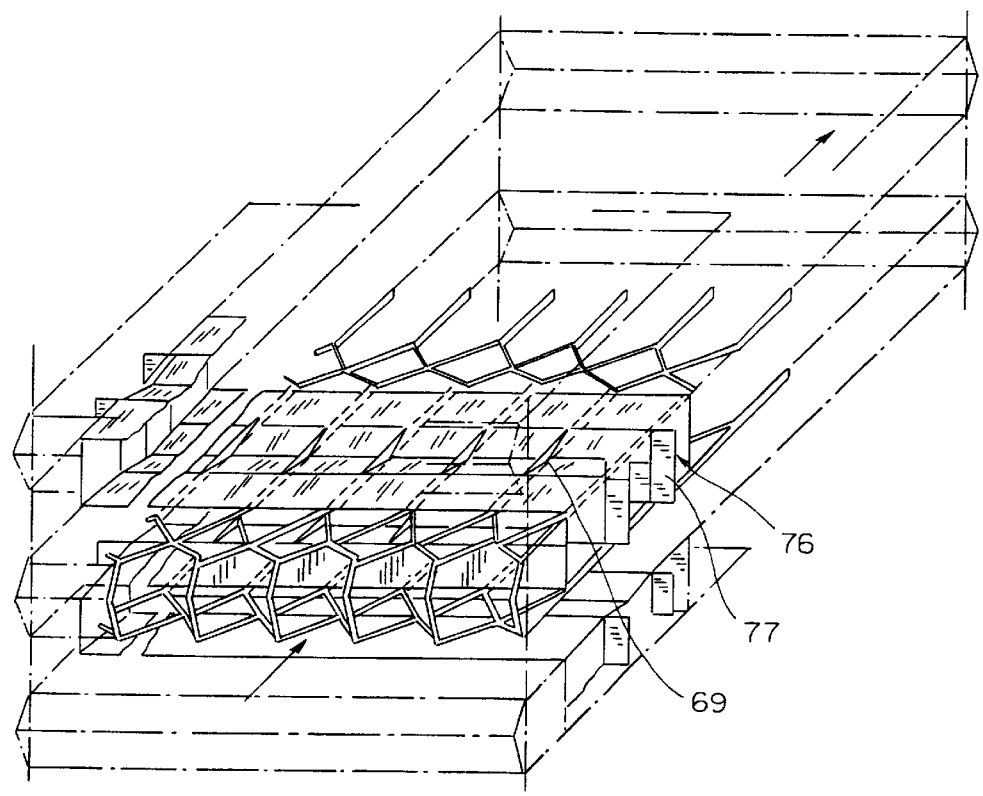
FIG. 14 shows broader strips replacing individual stiffening strips.

According to FIG. 14, the individual stiffening strips can also be replaced by broader strips 76, laid in meandering fashion, which are woven into the expanded-metal layers in intersecting and stabilising fashion and which display laterally projecting sections 77, notched out on the deflecting areas, for fastening to a housing or for connecting with vertical stiffening elements. The middle areas of the strips are profiled with channels which run transverse to the flow paths and are provided with cuts into which webs 69 of the expanded-metal layers are inserted and thus stabilised by lateral fixing.

Figure 15:
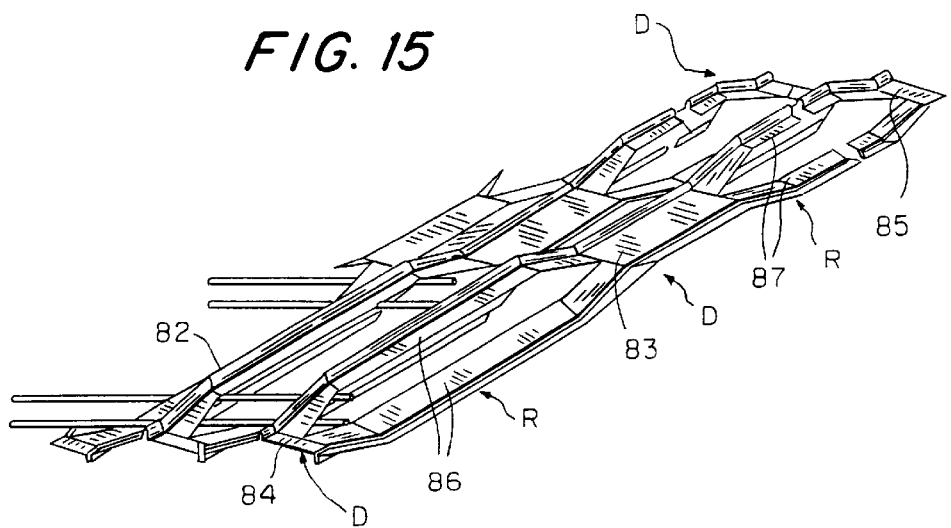
FIG. 15 shows a section of a foil layer corresponding to FIG. 4.

FIG. 15 shows a section of a foil layer 83, 84, 85 which, corresponding to FIG. 4, is provided with longitudinal fold ribs 82, where one flow chamber extending over the entire width and the entire height of the substrate is formed for two axial areas between foil layers laid in congruent fashion relative to each other. The slit-duct structure, in which the flow paths are separated from each other, is retained in three axial areas at the front, rear and in the middle for flow and stability-related reasons. Optimisation between flow and stability-related requirements is possible, depending on how the length of these areas is divided up. Three-pointed star profiles 86, 87, which have edges around which flow is possible and which are deflected upwards or downwards relative to the foil layer plane in accordance with FIGS. 10 and 11, are formed in foil layer sections 83, 84, 85 of the structured foil layer, which are located between middle area 83 and the front or rear area 84, 85, by longitudinal slitting and lateral compression into star profiles 86, 87, which are connected layer-by-layer in congruent, intermeshing fashion with vertical and horizontal stiffening elements 60 and 62 according to FIGS. 10 and 11 to form a substrate structure. In another configuration, obtuse-angled star profiles 86 and 87 can be twisted in the same or opposite directions relative to each other, thereby increasing the overall length of the edges around which flow is possible and the turbulence at the webs or their edges and surfaces, and also improving the swirling of the medium and the catalytic efficiency.

It goes without saying that, given appropriately slitted, plane and/or corrugated or angularly structured foil layers, and by means of stretching and local compression, bending and twisting, profiles around which flow is possible, with edges around which flow is possible, can be varied and adapted in various forms and arrangements relative to each other on the basis of general specialised knowledge to meet many specific application-related requirements.

Figure 16:
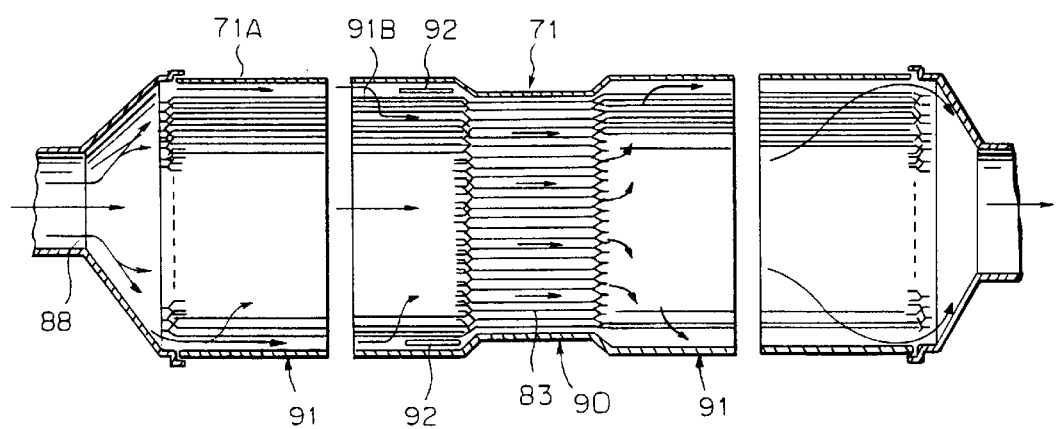
FIG. 16 shows a catalytic converter constructed with foil layers.

As shown in FIG. 16, foil layers designed as described in connection with FIG. 15 can be used to construct a catalytic converter in which, owing to the distanced housing areas 91a, the medium can flow into the substrate both from the face end and from the sides in the inlet area, specifically from all four lateral boundary surfaces 91b, although inlet from only two sides or one side is also possible. Here again, the substrate structure is open on all sides and designed as a profile bundle in a surrounding, common gas plenum, where the expansion of the medium in the middle area of the substrate is restricted, in this case by the slit-like flow ducts formed by sections 83 of the foil layers. In middle area 90 of the substrate, housing 71 displays a reduced cross-section compared to upstream and downstream areas 91. In order to restrict the lateral inlet and outlet of the medium into laterally open substrate areas 91 for homogenisation to a certain section, configurable flow guide vanes 92 are provided, which follow on from the middle housing area and can be designed of different axial length or in sliding fashion relative to the housing, thus making the flow characteristics of the catalytic converter variable.

Alternatively, areas 90, 91 of the substrate can also be designed as separate substrates.

Figure 17:
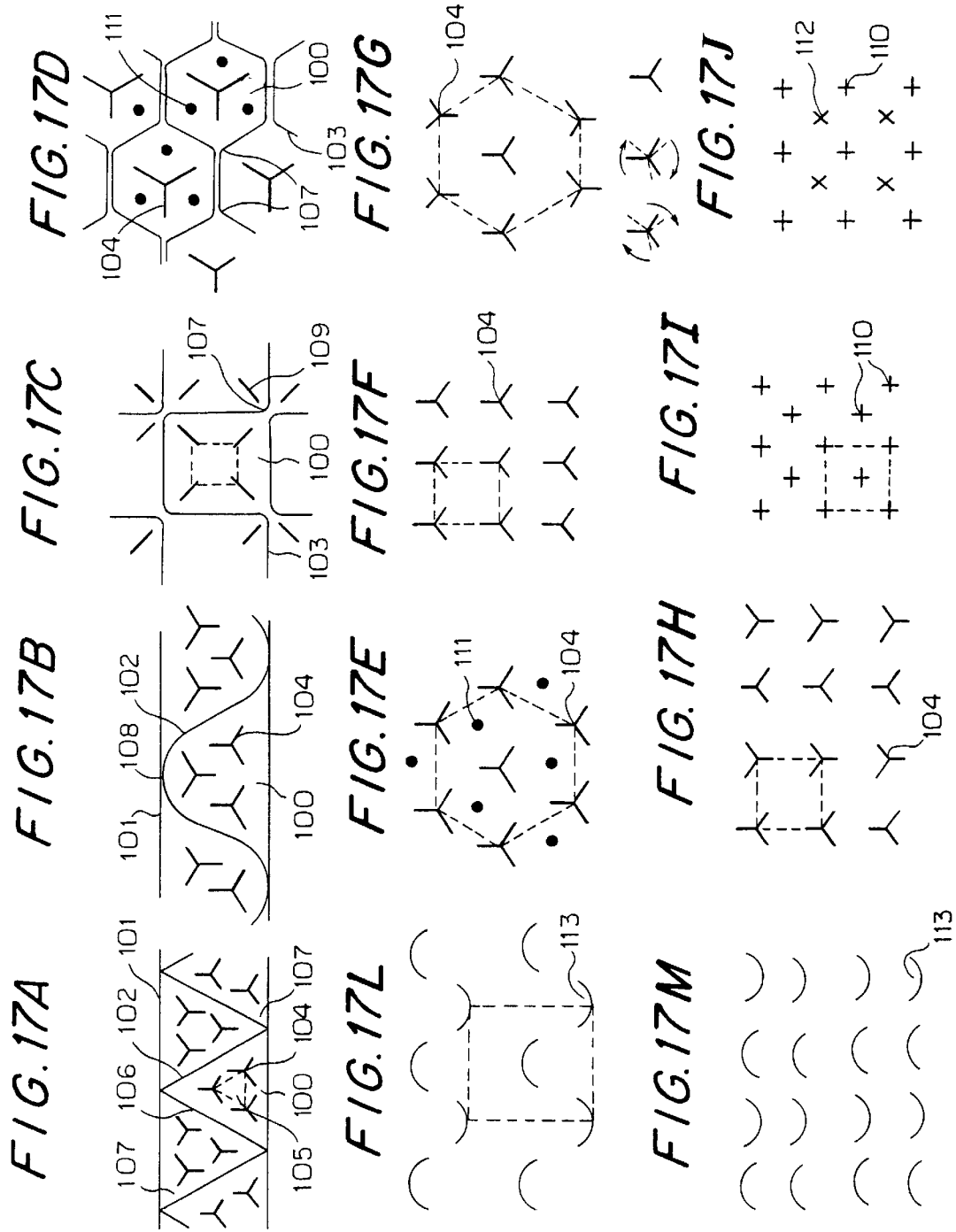
FIGS. 17a–d show various arrangements of webs having edges around which flow is possible.
FIGS. 17e–j show arrangements of profile bundles arranged in a common gas plenum.
FIGS. 17l and m show arrangements of channel-shaped profiles having a contour in the form of an arc of a circle.

FIG. 17 shows various arrangements of webs, each having two, three or four edges around which flow is possible, where several webs can be connected by foil sections at the ends, as shown in FIG. 4, 10 or 11, for example.

According to FIGS. 17a–d, bundles of profile webs are arranged in flow ducts 100 with a triangular, sinusoidal, square or hexagonal cross-section. These duct structures can be produced by the alternate arrangement of smooth and zigzag-shaped or corrugated foil layers 101, 102 (FIGS. 17a and b) or by congruent or mirror-image positioning of identically profiled foil layers 103. According to FIGS. 17a and b, three profile webs 104 are arranged in the separate flow ducts 104, each having three profile ribs arranged in a star shape, each enclosing an angle of 120°. According to FIG. 17a, the profiles are positioned in a trigonal arrangement in offset fashion relative to each other with the same orientation relative to the duct walls (see dotted line) and surround a central flow path 105. The profile ribs are roughly aligned with the middle of the walls 106 and abutment lines 107 of adjacent ducts.

According to FIG. 17b, the three-pointed profile webs are arranged in the gaps of each other in a distorted trigonal arrangement in sinusoidal ducts 100, where profile ribs forming a V-shape with each other face vertex 108 of the foil layer corrugation.

According to FIG. 17c, flat profile webs 109 with two edges around which flow is possible are arranged in square fashion in the ducts, which are likewise square, with the result that, as in FIG. 17a, the geometry of the web arrangement corresponds to the duct geometry. The edges of webs 109 around which flow is possible point towards the centre of duct 100 and to abutment lines 107 of adjacent ducts 100. In a possible modification, the four webs 109 can also be combined into one four-ribbed web with its centre axis in the centre of the duct.

Three-ribbed webs 104 are located at the centre of hexagonal flow ducts 100 according to FIG. 17d, where the ribs point to abutment lines 107 of adjacent ducts 100. Wires 111, around which flow is possible, are located at the centre of the rhombic spaces between, although other profiles can also be provided.

FIGS. 17e–k show arrangements of profile bundles arranged in a common gas plenum. Profile webs 104 are designed in accordance with FIG. 17a, while profile webs 110 are of four-ribbed design with fourfold symmetry. As indicated by the arrows in FIG. 17g, the profile webs can also be twisted, this also applying to the profile webs in FIGS. 17a–f, h–k, particularly in the same direction in each case.

In detail, wires 111, around which flow is possible, are located at the centre of the hexagonal spaces in the hexagonally centred arrangement (see dotted line) of the identically oriented, mutually offset webs 104 according to FIG. 17e.

According to FIG. 17f, three-ribbed webs 104 have the same orientation relative to a reference point and are arranged in a rectangular pattern, which is square in this case.

The arrangement of the webs according to FIG. 17g corresponds to that of FIG. 17e, where the webs in every other horizontal row in the illustration are rotated through 180° and positioned in the gaps of the respectively adjacent row.

Differing from FIG. 17f, the webs in FIGS. 17h are rotated through 180° relative to the adjacent row in every other vertical row, the square arrangement of the webs being retained.

FIGS. 17i and k how quadratically centred arrangements of four-ribbed webs, where the webs according to FIG. 17i are oriented in the same direction relative to each other and centring webs 112 according to FIG. 17k are each rotated through 45° relative to the position in FIG. 17i, so that the ribs point in the direction of the bisecting line of the angle enclosed by adjacent ribs of webs 110.

FIGS. 17l and m show arrangements of channel-shaped profiles having a contour in the form of an arc of circle. According to FIG. 17l, channels 114 are arranged in orthogonally centred fashion, where channels of adjacent horizontal rows are rotated through 180° about their longitudinal axis and laterally offset in relation to the adjacent row. In this context, the distance between channels is such that the edges of one channel are positioned above a channel of an adjacent row. FIG. 17m shows an orthogonal channel arrangement in which the channels are stacked in congruent fashion in vertical rows, where the channels of adjacent stacks are arranged with their insides facing in opposite directions to each other.

It goes without saying that other arrangements of the webs, which can also display more than four ribs, and other combinations of webs, possibly also with other types of carrier elements and/or in other duct geometries are also possible.

Figure 18A:
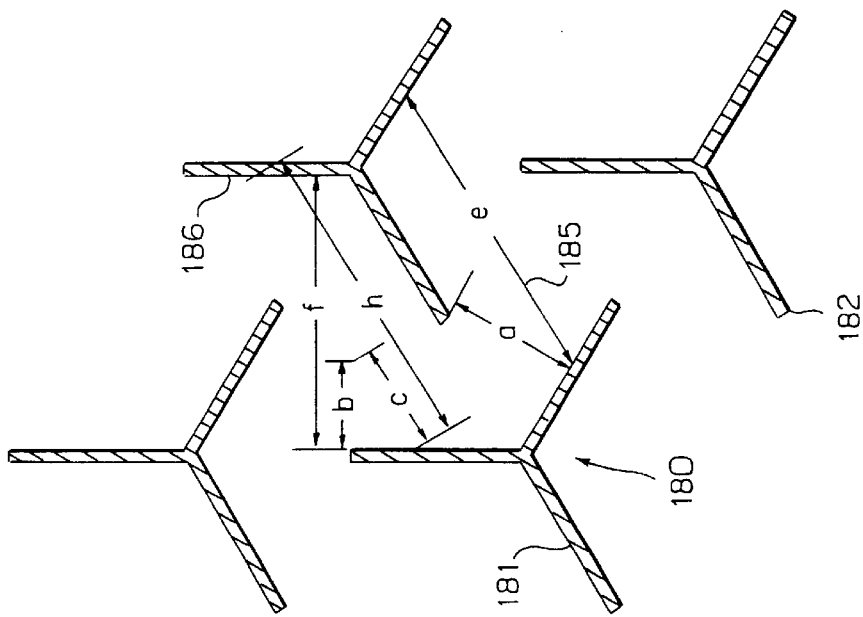
FIG. 18 shows a section of a substrate with an arrangement of four identical carrier elements.
Figure 18B:
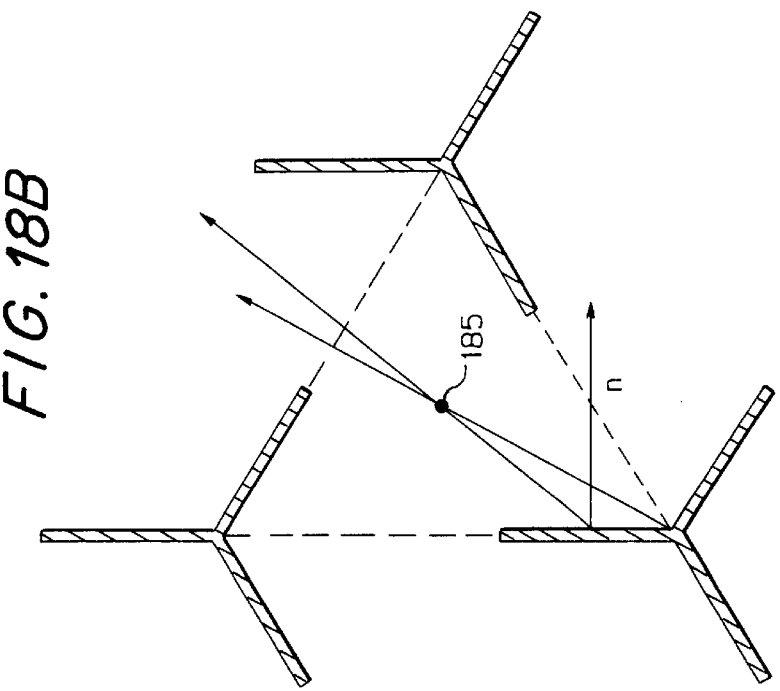

By way of example, FIG. 18 shows a section of a substrate with an arrangement of four identical carrier elements 180, each with three ribs 181 that enclose an angle of 120°. Elongated carrier elements 180 are packed in a two-dimensionally, hexagonally densest arrangement, where edges 182, around which free flow is possible, are aligned along the bisecting line (dotted line) of the angle of the adjacent carrier element. The shortest distance between surfaces of adjacent carrier elements around which flow is possible, which border a flow path, is in this case distance a of edges 182, around which flow is possible, from the surface of the ribs of adjacent carrier element 180. In the practical example, the shortest distance a is determined by the capacity for dip-coating without congestion and amounts to 3 to 20 times the coating thickness or more, this resulting, in automotive applications for example, in distances of 0.075 to 2.5 mm with a foil thickness of 0.025 to 0.125 mm. Given an appropriate packing density, the smallest distance can also be very much larger, e.g. up to 10 mm or more, with comparable flow and structure thickness conditions. At the tightest coatable and reliably separable spacing, this produces a "hard", short reaction chamber, while a wider spacing produces a "soft", long reaction chamber.

Particularly for controlling the reaction, the substrate can display different packing densities, which can increase, decrease and/or change uniformly or abruptly from the inlet to the outlet. A free cross-section between the solid components of the structure (porosity) of approximately 45% to 98% has proven to be advantageous for various application requirement.

The distance of the flow path with the highest flow velocity, i.e. the core flow, represents the shortest distance b of the centre point of the flow duct 185 to the nearest carrier element surfaces 186 that border the corresponding flow path, where distance c is the distance of the core flow from the central longitudinal axis of the area of the carrier profile bordering the flow path. In the arrangement shown, the shortest distance e between essentially parallel carrier surfaces of adjacent carrier elements is a multiple of shortest distance a, approximately three times this distance in this case. The shortest distance f between carrier element surfaces of adjacent carrier elements in extension of distance vector b is a multiple of the same, approximately three times this distance in this case. Distance h in extension of distance vector c from the nearest carrier element surface h is again a multiple of distance c, three times this distance in this case, and can also be substantially greater given an appropriate arrangement of the carrier elements.

In addition, FIG. 18 (right) shows a corresponding arrangement with enlarged carrier element distances. In particular, in this practical example, not only the line connecting the centre-of-gravity axis of a carrier element surface assigned to a specific duct-shaped flow area and the flow path of the core flow leads to an adjacent carrier element surface that is located outside the flow path (indicated by the dotted extensions of the carrier element areas) and also does not hit another partial area of an adjacent carrier element. The surface normal n at the centre of gravity of a carrier element surface assigned to a flow path also leads beyond the flow path. Moreover, the line connecting the centre-of-gravity axis of the carrier element to the flow path of the core flow also leads to an adjacent carrier element surface located outside the flow duct.

The geometrical relationships described can also be realised with other carrier profile arrangements, e.g. as shown in FIG. 17, and also with curved carrier element surfaces.

According to the invention, more or less dense packing of the profiles can be used to ensure that, by offsetting the centres of the profiles, the micro-vortices forming on their surfaces due to gas adhesion are not cancelled out in the opposite direction on closely adjacent surfaces, thus building up a laminar flow that obstructs diffusion. Rather, the profiles are arranged in such a way that no further microvortex, rotating in the opposite direction, is generated within a given distance from a micro-vortex forming on a surface.

What is claimed is:

1. A catalytic converter substrate having a large number of continuous flow paths for a fluid medium and having carrier elements for a catalyst material extending in the longitudinal direction of the flow paths, wherein carrier elements are provided, said carrier elements not resting on each other and displaying edges around which, at least in some areas, flow is possible in the longitudinal direction of the flow paths;
   wherein the carrier elements are designed as elements selected from the group consisting of
   (a) carrier elements designed to permit flow around their full circumference, at least in some areas,
   (b) carrier elements designed as web-shaped foil folds of foil sections of the converter substrate in the form of notched tabs; and
   (c) web-shaped foil folds of foil sections in the form of flat folded webs folded at least twice wherein the width of the webs is such that the distance between flanks of the folded web is sufficiently small that a coating material to be used for coating the webs would not penetrate between the web flanks, or that legs of the fold of the webs contact each other;
   wherein additional stiffening elements are provided acting on the edges of the carrier elements in such a way that a change in position of the carrier elements is restricted while flow around the carrier elements is possible.

2. The substrate according to claim 1, wherein the overall length of the edges (5, 8, 18, 59) around which flow is possible along a flow path is at least one-quarter of the length of the substrate (66).

3. The substrate according to claim 2, wherein the substrate (66) is constructed from profiled foil layers (1, 10, 16) arranged one above the other and the carrier elements are designed as web-shaped foil folds (3, 7, 11) of the foil layers (1, 10, 16).

4. The substrate according to claim 3, wherein the carrier elements (27, 28, 33, 45, 61, 69, 86) are designed optionally to permit flow around their full circumferences.

5. The substrate according to claim 1, wherein the substrate (66) is constructed from profiled foil layers (1, 10, 16) arranged one above the other and the carrier elements are designed as web-shaped foil folds (3, 7, 11) of the foil layers (1, 10, 16).

6. The substrate according to claim 1, wherein the carrier elements (27, 28, 33, 45, 61, 69, 86) are designed to permit flow around their full circumferences, at least in some areas.

7. The substrate according to claim 6, wherein the carrier elements (3, 7, 11, 17, 27, 28, 33, 45, 55) are located within flow ducts (2, 10a, 25, 41) which restrict an exchange of medium transverse to the longitudinal direction of the flow paths.

8. The substrate according to claim 1, wherein the carrier elements (3, 7, 17, 27, 33, 45, 55, 61) are located at the center of flow ducts (2, 10a, 25, 41).

9. The substrate according to claim 1, wherein the carrier elements (28) display edges around which flow is possible that are of arch shaped design, at least in some sections.

10. The substrate according to claim 1, wherein the carrier elements (28) display curved outer surfaces, at least in some sections, that set the medium in rotary motion as it flows past.

11. The substrate according to claim 1, wherein at least one area (51, 100) of the substrate with a large number of adjacent carrier elements (52, 69, 104, 111) is provided that permits an unobstructed gas exchange transverse to the longitudinal direction of the flow paths.

12. The substrate according to claim 11, wherein connecting elements (29, 34, 46, 68) for connecting the carrier elements (3, 7, 17, 27, 33, 45, 55, 61) are provided, at least in partial volume areas of the substrate, and a cross section of the connecting elements (29, 34, 46, 68) is dimensioned in such a way that flow resistance in the longitudinal direction through the substrate is not significantly increased.

13. The substrate according to claim 1, wherein the carrier elements are designed as expanded-metal layers (32, 52) or wire meshes (21, 44, 46).

14. The substrate according to claim 1, wherein stiffening elements (6, 12, 20, 26) are provided, which extend perpendicular and/or parallel to foil layers (1, 10, 16, 23) making up the substrate and restrict a change in position of the foil layers (1, 10, 16, 23) from a target position.

15. The substrate according to claim 14, wherein the stiffening elements (6, 12, 20, 26) are fastened to the foil layers (1, 10, 16, 23) and/or carrier elements (3, 7, 17, 27, 20 33, 45, 55, 61) and/or connecting elements (29, 34, 46, 68) in a manner capable of absorbing tensile forces.

16. The substrate according to claim 15, wherein the stiffening elements (6, 12, 20, 26) are fastened to a housing (71) surrounding the substrate, or to wall sections (54) passing through the substrate, in a manner capable of absorbing tensile forces.

17. The substrate according to claim 1, wherein the substrate displays several areas (90, 91) a distance away from face ends in the direction of flow, which areas extend in the lateral direction across one or more carrier elements, and wherein at least two of these areas (90, 91) differ as regards their structure.

18. The substrate according to claim 1, wherein inlet and/or outlet areas of the substrate or of substrate areas (90, 91) are provided with means (51) which permit a change in the direction of flow of an inflowing or outflowing medium.

19. The substrate according to claim 1, wherein a housing (71) is laterally separated from the substrate (91) over part of the length of the substrate (91), at least in some areas, and the substrate (91) is designed in such a way that a side area (91*b*) opposite a separated housing area (71*a*) is permeable to the medium.

20. The substrate according to claim 1 wherein connecting elements are provided to connect carrier elements and stiffening elements are provided which act on the connecting elements and which stiffening elements are designed in such a way that a change in position of the connecting elements is restricted.

21. The substrate according to claim 20, wherein the stiffening elements (6, 12, 20, 26) are 25 fastened to a housing (71) surrounding the substrate, or to wall sections (54) passing through the substrate, in a manner capable of absorbing tensile forces.

22. The substrate according to claim 20, wherein the stiffening elements (6, 12, 20, 26) are fastened to the foil layers (1, 10, 16, 23) and/or carrier elements (3, 7, 17, 27, 33, 45, 55, 61) and/or connecting elements (29, 34, 46, 8) in a manner capable of absorbing tensile forces.

23. The substrate according to claim 1 wherein the web-shaped foil folds are designed in the form of foil webs of foil sections of the converter substrate, wherein the foil folds have a folding angle of less than 30E and have a distance of the edges around which flow is possible of a multiple of a circumscribing diameter of the web-shaped foil folds.

24. The substrate according to claim 1 wherein the carrier elements are designed as foil folds in the form of notched tabs of foil layers.

25. A catalytic converter substrate having a large number of continuous flow paths for a fluid medium and having carrier elements for a catalyst material extending in the longitudinal direction of the flow paths, wherein carrier elements are provided, said carrier elements displaying edges around which, at least in some areas, flow is possible in the longitudinal direction of the flow paths;

wherein the carrier elements are designed as elements selected from the group consisting of:
  a. carrier elements designed to permit flow around their full circumference, at least in some areas;
  b. carrier elements designed as web-shaped foil folds of foil sections of the converter substrate in the form of notched tabs; and
  c. web-shaped foil folds of foil sections in the form of flat folded webs folded at least twice, wherein the width of the flat folded webs is such that the distance between flanks of the flat folded webs is sufficiently small that a coating material to be used for coating the webs would not penetrate between the web flanks, or that legs of the fold of the webs contact each other;
 wherein stiffening elements are provided which act directly on the carrier elements in such a way that a change in position of the carrier elements are restricted;
 wherein the converter consists of foil layers wherein all of the foil layers are structured.

26. A catalytic converter substrate having a large number of continuous flow paths for a fluid medium and having carrier elements for a catalyst material extending in the longitudinal direction of the flow paths, wherein carrier elements are provided, said carrier elements displaying edges around which, at least in some areas, flow is possible in the longitudinal direction of the flow paths;

wherein the carrier elements are designed as elements selected from the group consisting of:
  a. carrier elements designed to permit flow around their full circumference, at least in some areas;
  b. carrier elements designed as web-shaped foil folds of foil sections of the converter substrate in the form of notched tabs; and
  c. web-shaped foil folds of foil sections in the form of flat folded webs folded at least twice, wherein the width of the flat folded webs is such that the distance between flanks of the flat folded webs is sufficiently small that a coating material to be used for coating the webs would not penetrate between the web flanks, or that legs of the fold of the webs contact each other;
 wherein stiffening elements are provided which act directly on the carrier elements in such a way that a change in position of the carrier elements is restricted;
 wherein the stiffening elements are separate elements in the form of strips, wires, or expanded metal layers which directly support the carrier elements; and
 wherein the carrier elements support the stiffening elements at some points and display edges around which flow is possible at other points.

27. A catalytic converter substrate having a large number of continuous flow paths for a fluid medium and having carrier elements for a catalyst material extending in the longitudinal direction of the flow paths, wherein carrier elements are provided, said carrier elements displaying edges around which, at least in some areas, flow is possible in the longitudinal direction of the flow paths;

wherein the carrier elements are designed as elements selected from the group consisting of:
  a. carrier elements designed to permit flow around their full circumference, at least in some areas;
  b. carrier elements designed as web-shaped foil folds of foil sections of the converter substrate in the form of notched tabs; and c. web-shaped foil folds of foil sections in the form of flat folded webs folded at least twice, wherein the width of the flat folded webs is such that the distance between flanks of the flat folded webs is sufficiently small that a coating material to be used for coating the webs would not penetrate between the web flanks, or that legs of the fold of the webs contact each other;

wherein stiffening elements are provided which act directly on the carrier elements in such a way that a change in position of the carrier elements is restricted;

wherein the carrier elements at least in some areas permit flow around the full circumference of the carrier elements;

wherein connecting elements are provided for connecting the carrier elements at least in partial volume areas of the substrate; and a cross-section of the carrier elements is dimensioned in such a way that flow resistance in the longitudinal direction through the substrate is not significantly increased;

wherein the carrier elements and the connecting elements are formed from a metal strip which is the same metal strip, the connecting elements being extensible in the plane of the metal strip and laterally projecting tabs which are part of the expanded metal strip are provided for fastening the metal strip at a housing.

* * * * *